(12) United States Patent
Okuma et al.

(10) Patent No.: US 10,898,975 B2
(45) Date of Patent: Jan. 26, 2021

(54) LASER MACHINING DEVICE AND LASER MACHINING METHOD

(71) Applicant: HAMAMATSU PHOTONICS K.K., Hamamatsu (JP)

(72) Inventors: Junji Okuma, Hamamatsu (JP); Yo Sugimoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 366 days.

(21) Appl. No.: 15/753,311

(22) PCT Filed: Aug. 8, 2016

(86) PCT No.: PCT/JP2016/073343
§ 371 (c)(1),
(2) Date: Feb. 17, 2018

(87) PCT Pub. No.: WO2017/030039
PCT Pub. Date: Feb. 23, 2017

(65) Prior Publication Data
US 2018/0236608 A1 Aug. 23, 2018

(30) Foreign Application Priority Data
Aug. 18, 2015 (JP) ................................. 2015-161208

(51) Int. Cl.
*B23K 26/53* (2014.01)
*B23K 26/0622* (2014.01)
(Continued)

(52) U.S. Cl.
CPC .......... *B23K 26/53* (2015.10); *B23K 26/0006* (2013.01); *B23K 26/032* (2013.01);
(Continued)

(58) Field of Classification Search
CPC .............. B23K 26/0622; B23K 26/364; B23K 26/0006; B23K 26/032; B23K 26/06; B23K 26/083
(Continued)

(56) References Cited

U.S. PATENT DOCUMENTS 8,890,027 B2 * 11/2014 Fukuyo ............. B23K 26/0853
219/121.72
2012/0006799 A1 * 1/2012 Sugiura .................. B23K 26/53
219/121.72
(Continued)

FOREIGN PATENT DOCUMENTS

| JP | 2008-108459 A | 5/2008 |
|---|---|---|
| JP | 2014-87833 A | 5/2014 |
| JP | 2015-62923 A | 4/2015 |

OTHER PUBLICATIONS

International Preliminary Report on Patentability dated Mar. 1, 2018 for PCT/JP2016/073343.

*Primary Examiner* — Jennifer C Chiang
(74) *Attorney, Agent, or Firm* — Faegre Drinker Biddle & Reath LLP

(57) ABSTRACT

A laser processing device includes: a support table; a laser light source; a converging optical system; an imaging unit configured to image a front surface of an object; a candidate line setting unit configured to set a plurality of candidate lines; an operation controller configured to control operation of at least one of the support table, the laser light source, and the converging optical system such that a modified region is formed inside the object along each of the plurality of candidate lines, and a crack reaches the front surface of the object from the modified region; and a reference line setting unit configured to set a reference line determined as a line indicating a crystal orientation of the object on the basis of an image of the crack.

17 Claims, 21 Drawing Sheets

(51) Int. Cl.
*B23K 26/08* (2014.01)
*B23K 26/03* (2006.01)
*B23K 26/00* (2014.01)
*B23K 26/364* (2014.01)
*B23K 26/06* (2014.01)

(52) U.S. Cl.
CPC .......... *B23K 26/06* (2013.01); *B23K 26/0622* (2015.10); *B23K 26/083* (2013.01); *B23K 26/364* (2015.10)

(58) Field of Classification Search
USPC .................................................... 219/121.72
See application file for complete search history.

(56) References Cited

U.S. PATENT DOCUMENTS

2018/0236597 A1* 8/2018 Okuma .............. B23K 26/0869
2019/0126393 A1* 5/2019 Igasaki .................... G02F 1/13

* cited by examiner

Fig.9
(a)
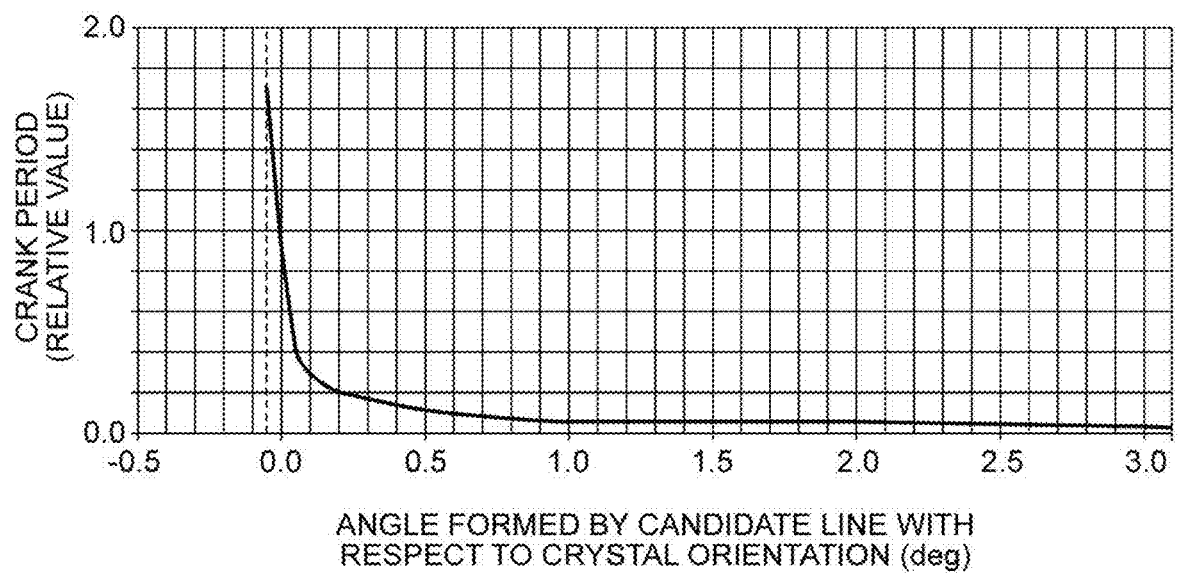
(b)
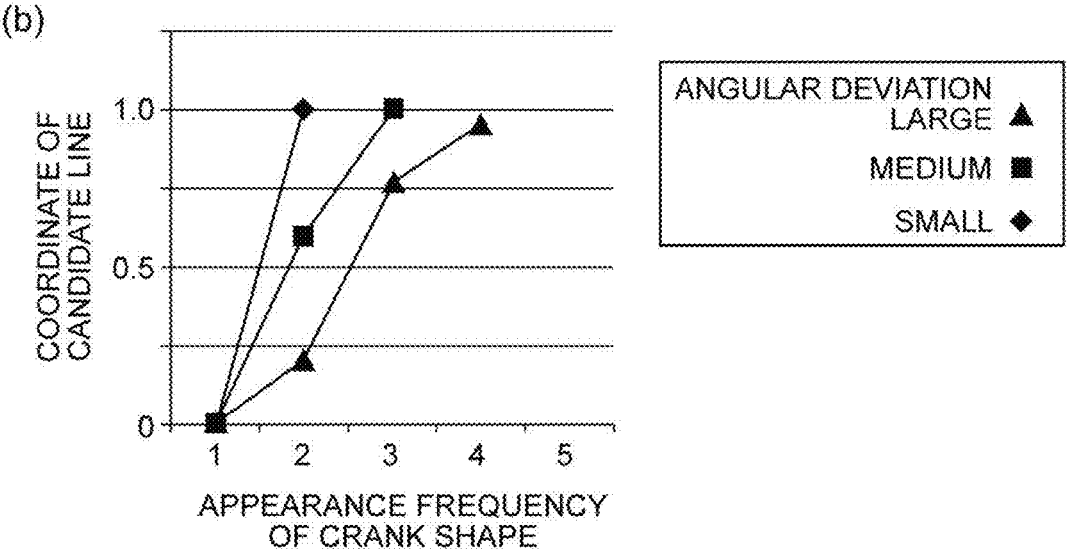

Fig.11
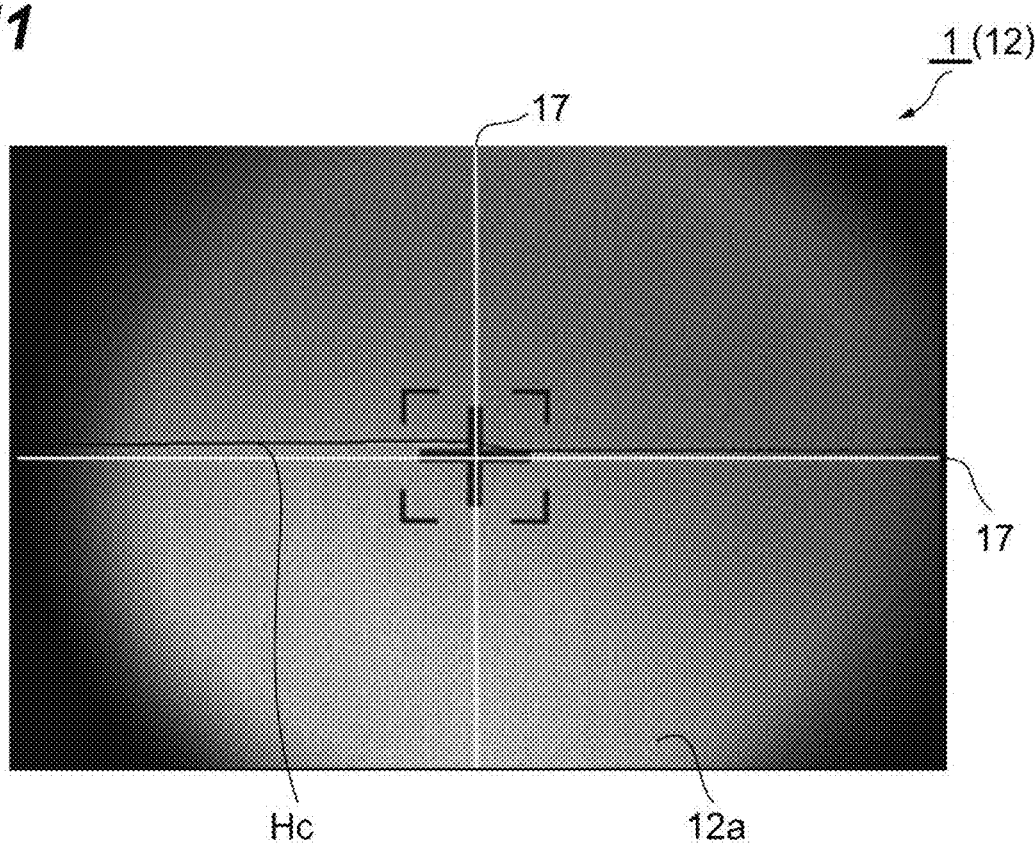
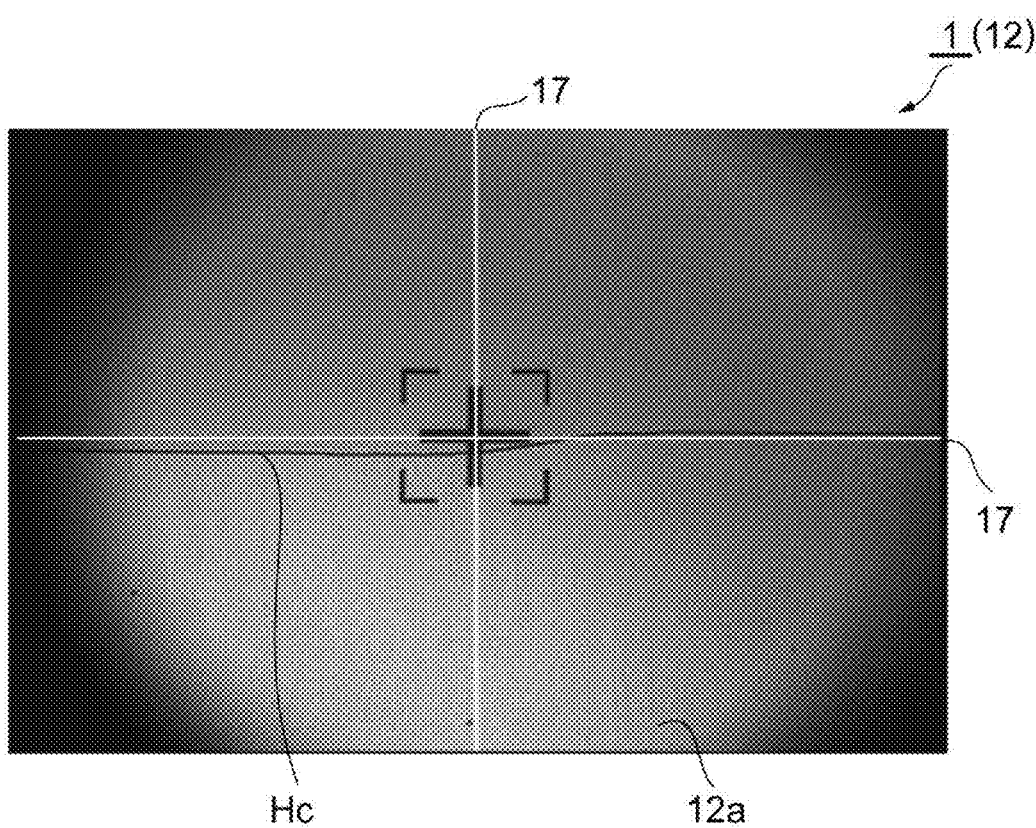

Fig. 15
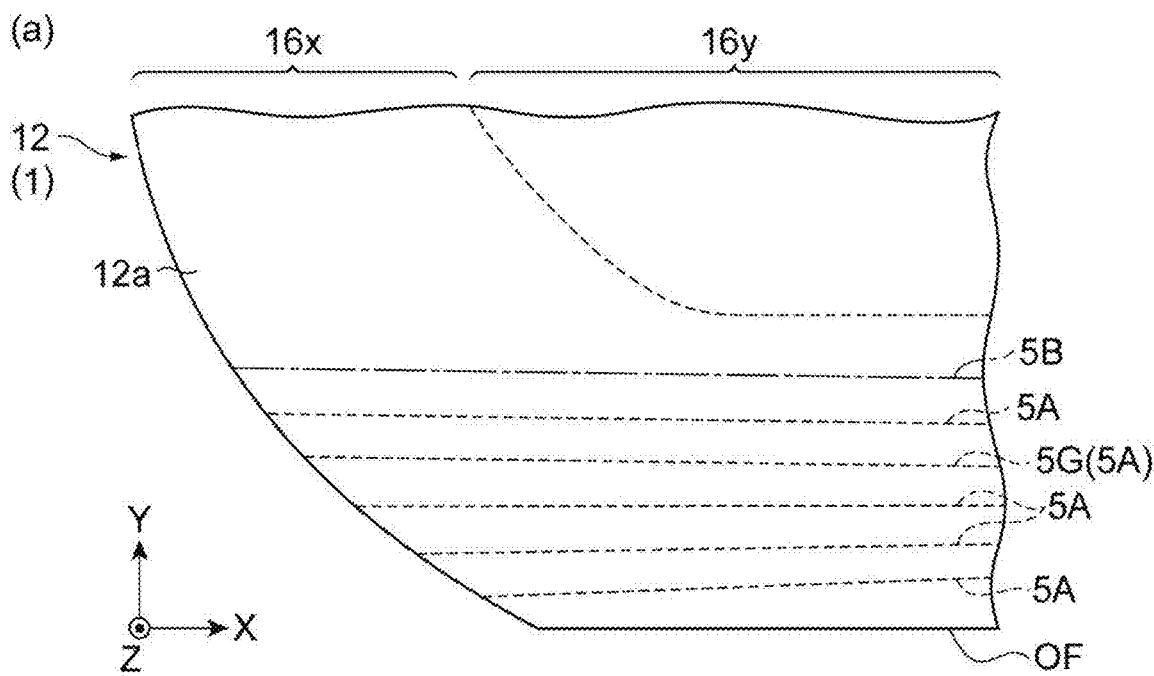
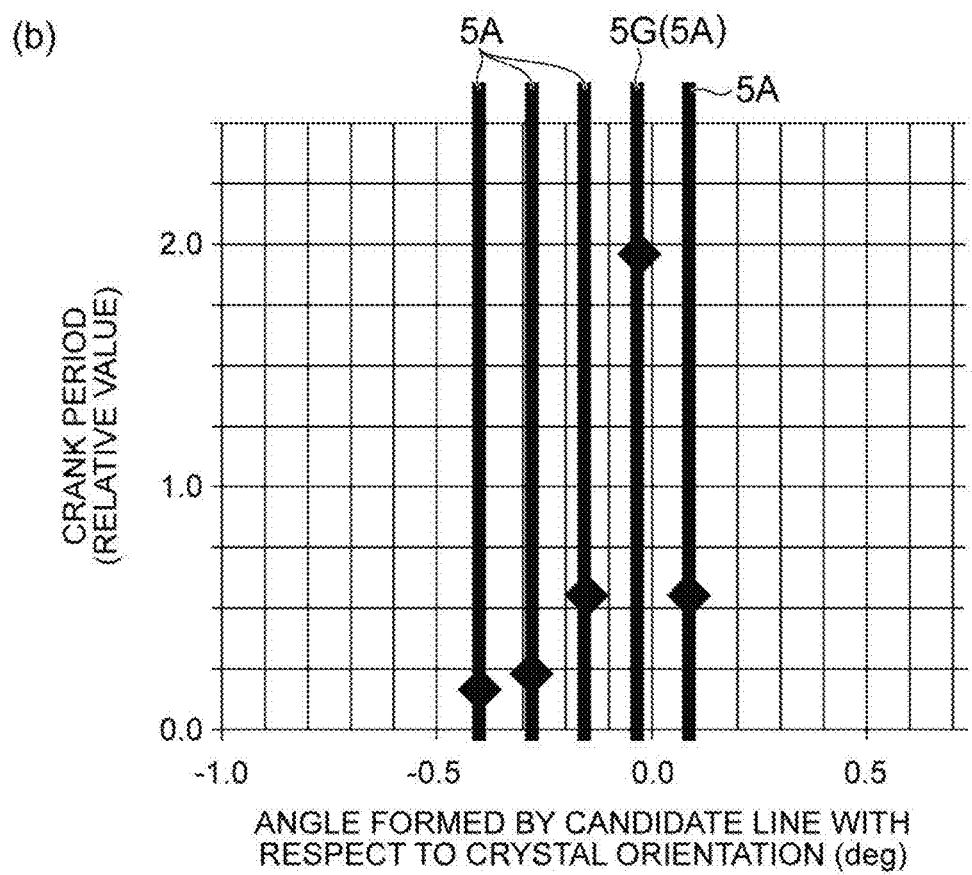

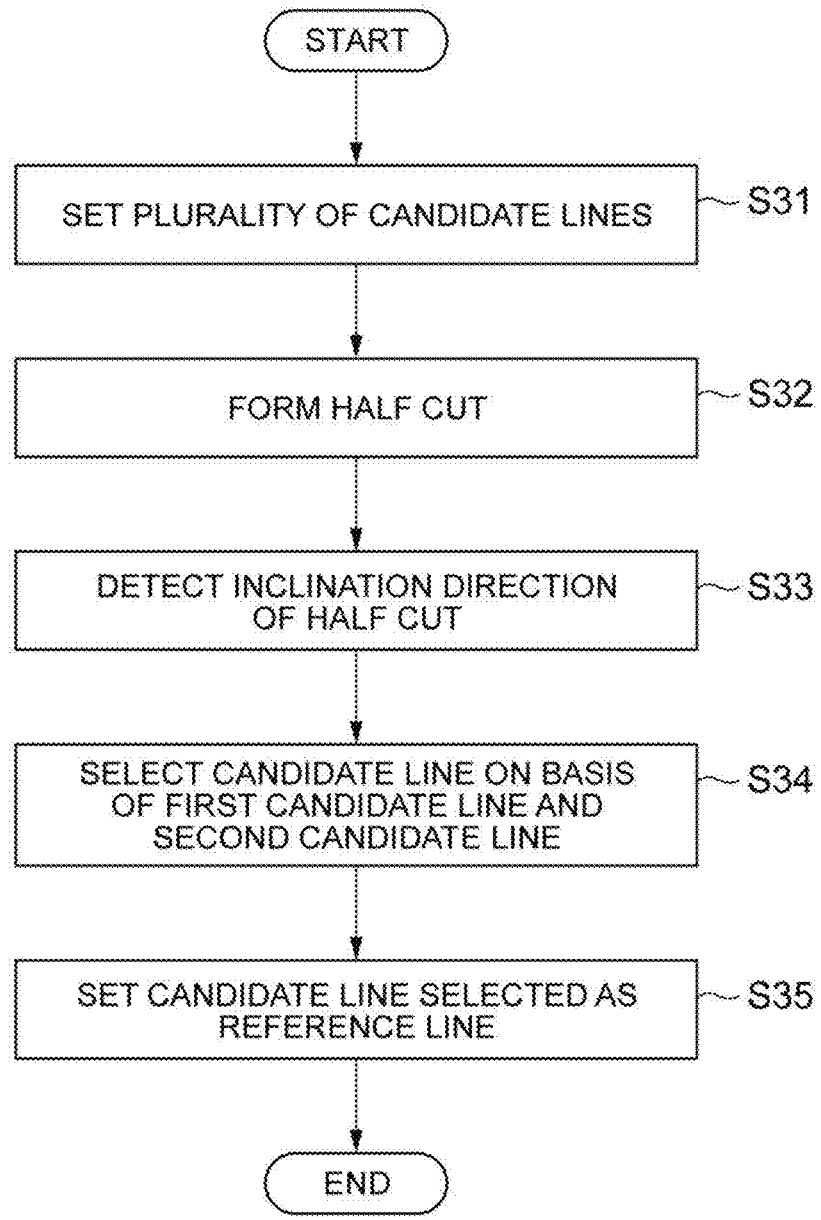

(DISTANCE BETWEEN PLURALITY OF CANDIDATE LINES 100 μm)

| LINE ROTATION ANGLE (deg) | 0.000 | 0.010 | 0.020 | 0.023 | 0.024 | 0.025 REFERENCE LINE | 0.026 | 0.027 | 0.030 | 0.040 |
|---|---|---|---|---|---|---|---|---|---|---|
| INCLINATION DIRECTION OF HALF CUT | UPPER SIDE | UPPER SIDE | UPPER SIDE | UPPER SIDE | UPPER SIDE | — (NO INCLINATION) | LOWER SIDE | LOWER SIDE | LOWER SIDE | LOWER SIDE |
| NUMBER OF CRANK SHAPES | 2 | 2 | 0 (NO CRANK SHAPE) | 0 (NO CRANK SHAPE) | 0 (NO CRANK SHAPE) | 0 (NO CRANK SHAPE) | 0 (NO CRANK SHAPE) | 1 | 1 | 2 |

(b)

(DISTANCE BETWEEN PLURALITY OF CANDIDATE LINES 50 μm)

| LINE ROTATION ANGLE (deg) | 0.000 | 0.010 | 0.020 | 0.023 | 0.024 | 0.025 REFERENCE LINE | 0.026 | 0.027 | 0.030 | 0.040 |
|---|---|---|---|---|---|---|---|---|---|---|
| INCLINATION DIRECTION OF HALF CUT | UPPER SIDE | UPPER SIDE | UPPER SIDE | UPPER SIDE | UPPER SIDE | — (NO INCLINATION) | LOWER SIDE | LOWER SIDE | LOWER SIDE | LOWER SIDE |
| NUMBER OF CRANK SHAPES | 2 | 2 | 1 | 0 (NO CRANK SHAPE) | 0 (NO CRANK SHAPE) | 0 (NO CRANK SHAPE) | 0 (NO CRANK SHAPE) | 1 | 1 | 2 |

LASER MACHINING DEVICE AND LASER MACHINING METHOD

TECHNICAL FIELD

One aspect of the present invention relates to a laser processing device and a laser processing method.

BACKGROUND ART

A technique is known that forms a cutting start point region along each of a plurality of lines to cut set in a grid pattern for an object to be processed including a substrate made of a crystalline material, and causes a crack to reach the front surface and the back surface of the object to be processed from the cutting start point region, to obtain a plurality of chips by cutting the object to be processed along each of the plurality of lines to cut (see Patent Literature 1, for example). Examples of the cutting start point region include a modified region formed inside the substrate, a groove formed on the front surface of the object to be processed, and the like.

CITATION LIST

Patent Literature

Patent Literature 1: Japanese Unexamined Patent Publication No. 2006-108459

SUMMARY OF INVENTION

Technical Problem

When the plurality of chips is obtained by cutting the object to be processed with the technique as described above, a level difference appears on the cut surface of the chip, and the yield of the chip is reduced, in some cases. The inventors of the present invention have found that appearance of the level difference is caused by the fact that the line to cut is set to deviate with respect to a crystal orientation of the substrate of the object to be processed.

An object of one aspect of the present invention is to provide a laser processing device and a laser processing method capable of inhibiting a line to cut from deviating with respect to the crystal orientation of the substrate of the object to be processed and being set.

Solution to Problem

A laser processing device according to one aspect of the present invention includes: a support table configured to support an object to be processed including a substrate made of a crystalline material; a laser light source configured to emit laser light; a converging optical system configured to converge the light emitted from the laser light source at the object to be processed supported by the support table; an imaging unit configured to image a front surface of the object to be processed supported by the support table; a candidate line setting unit configured to set, for the object to be processed, a plurality of candidate lines extending in mutually different directions; an operation controller configured to control operation of at least one of the support table, the laser light source, and the converging optical system such that a modified region is formed inside the substrate along each of the plurality of candidate lines, and a crack reaches the front surface of the object to be processed from the modified region; and a reference line setting unit configured to set, for the object to be processed a reference line determined as a line indicating a crystal orientation of the substrate on the basis of an image of the crack imaged by the imaging unit.

The present inventors have found that, when the cutting start point region is formed along the candidate line, and the object to be processed is cut from the cutting start point region as a start point, the number of level differences that appears on the cut surface of the object to be processed increases as the degree of deflection of the crack with respect to the candidate line increases. Under this finding, in the laser processing device of the present invention, the reference line (line indicating the crystal orientation of the substrate) is set for the object to be processed, the reference line being determined on the basis of the image of the crack reaching the front surface of the object to be processed from the modified region along each of the plurality of candidate lines extending in mutually different directions. Accordingly, it is possible to set, for the object to be processed, the line to cut extending in a direction parallel to the reference line. Therefore, with the laser processing device of the present invention, it is possible to inhibit the line to cut from deviating with respect to the crystal orientation of the substrate of the object to be processed and being set.

In the laser processing device according to one aspect of the present invention, the candidate line setting unit may set, for the object to be processed, a predetermined number of the candidate lines extending in mutually different predetermined directions, and the reference line setting unit may set, for the object to be processed, a candidate line having a smallest degree of deflection of the crack out of the predetermined number of candidate lines, as the reference line. In this case, it is sufficient that laser light irradiation, confirmation of a state of the crack, and the like are performed only for the predetermined number of the candidate lines extending in mutually different predetermined directions, so that setting of the reference line for the object to be processed can be simply performed.

In the laser processing device according to one aspect of the present invention, the candidate line setting unit may set, for the object to be processed, the predetermined number of the candidate lines extending in mutually different predetermined directions, using an orientation flat provided to the object to be processed as a reference. In this case, fluctuation in settings of the candidate lines for each object to be processed can be inhibited.

In the laser processing device according to one aspect of the present invention, the candidate line setting unit may set the plurality of candidate lines sequentially for the object to be processed, until a degree of deflection of the crack falls within a predetermined range, on the basis of the image of the crack imaged by the imaging unit, and the reference line setting unit may set, for the object to be processed, one of the candidate lines of which the degree of deflection of the crack falls within the predetermined range, as the reference line. In this case, it is possible to set the reference line for the object to be processed with desired accuracy.

In the laser processing device according to one aspect of the present invention, the candidate line setting unit may set an initial candidate line for the object to be processed, using an orientation flat provided to the object to be processed as a reference. In this case, fluctuation in settings of the candidate lines for each object to be processed can be inhibited.

The laser processing device according to one aspect of the present invention may further include a storage unit storing in advance a relationship between an angle formed by the candidate line with respect to the crystal orientation and a degree of deflection of the crack. In a case where the plurality of candidate lines is sequentially set for the object to be processed, when a new candidate line is set, by using the relationship as an index, it is possible to reduce the number of candidate lines to be set until the degree of deflection of the crack falls within the predetermined range.

The laser processing device according to one aspect of the present invention may further include a display unit configured to display the image of the crack imaged by the imaging unit. In this case, an operator can confirm the state of the crack and the like.

In the laser processing device according to one aspect of the present invention, the operation controller may control operation of at least one of the support table, the laser light source, and the converging optical system such that a reference mark indicating the crystal orientation is formed on the object to be processed along the reference line set by the reference line setting unit. In this case, it is possible to set the line to cut extending in the direction parallel to the reference line for the object to be processed, using the reference mark as a reference.

The laser processing device according to one aspect of the present invention may further include a line to cut setting unit configured to set, for the object to be processed, a line to cut extending in a direction parallel to the reference line set by the reference line setting unit, in which the operation controller controls operation of at least one of the support table, the laser light source, and the converging optical system such that the modified region is formed inside the substrate along the line to cut set by the line to cut setting unit. In this case, a series of steps, such as laser light irradiation along the candidate line, confirmation of the state of the crack, setting of the reference line, setting of the line to cut, and laser light irradiation along the line to cut, can be performed in one laser processing device.

A laser processing method according to one aspect of the present invention includes: a first step of setting a plurality of candidate lines extending in mutually different directions, for an object to be processed including a substrate made of a crystalline material; a second step of converging laser light at the object to be processed such that a modified region is formed inside the substrate along each of the plurality of candidate lines, and a crack reaches a front surface of the object to be processed from the modified region; and a third step of setting, for the object to be processed, a reference line determined as a line indicating a crystal orientation of the substrate on the basis of a state of the crack.

With the laser light method according to one aspect of the present invention, for the same reason as the above-described laser processing device of the present invention, it is possible to inhibit the line to cut from deviating with respect to the crystal orientation of the substrate of the object to be processed and being set.

In the laser processing method according to one aspect of the present invention, in the first step, a predetermined number of the candidate lines extending in mutually different predetermined directions may be set for the object to be processed, and in the third step, out of the predetermined number of candidate lines, a candidate line having a smallest degree of deflection of the crack may be set for the object to be processed as the reference line. In this case, it is sufficient that laser light irradiation, confirmation of a state of the crack, and the like are performed only for the predetermined number of the candidate lines extending in mutually different predetermined directions, so that setting of the reference line for the object to be processed can be simply performed.

In the laser processing method according to one aspect of the present invention, in the first step, on the basis of a state of the crack, the plurality of candidate lines may be sequentially set for the object to be processed, until a degree of deflection of the crack falls within a predetermined range, and in the third step, one of the candidate lines of which the degree of deflection of the crack falls within the predetermined range may be set for the object to be processed as the reference line. In this case, it is possible to set the reference line for the object to be processed with desired accuracy.

In the laser processing device according to one aspect of the present invention, the candidate line setting unit may set, for the object to be processed, the plurality of candidate lines having different angles formed with respect to a reference direction, the reference line setting unit may detect an inclination direction in which the crack of each of the plurality of candidate lines is inclined with respect to corresponding one of the candidate lines, the reference line setting unit may set the reference line for the object to be processed, on the basis of a first candidate line of which an inclination direction of the crack is in one side of corresponding one of the candidate lines and an angle formed with respect to the reference direction is the largest or smallest, and a second candidate line of which an inclination direction of the crack is in another side of corresponding one of the candidate lines and an angle formed with respect to the reference direction is the smallest or largest, out of the plurality of candidate lines.

In the laser processing method according to one aspect of the present invention, in the first step, the plurality of candidate lines having different angles formed with respect to a reference direction may be set for the object to be processed, and in the third step, an inclination direction in which the crack of each of the plurality of candidate lines is inclined with respect to corresponding one of the candidate lines, may be detected, and the reference line may be set for the object to be processed, on the basis of a first candidate line of which an inclination direction of the crack is in one side of corresponding one of the candidate lines and an angle formed with respect to the reference direction is the largest or smallest, and a second candidate line of which an inclination direction of the crack is in another side of corresponding one of the candidate lines and an angle formed with respect to the reference direction is the smallest or largest, out of the plurality of candidate lines.

It is found that an angle between an angle formed by the first candidate line with respect to the reference direction and an angle formed by the second candidate line with respect to the reference direction corresponds to the crystal orientation of the substrate. Therefore, by setting the reference line that is the line indicating the crystal orientation of the substrate on the basis of the first and second candidate lines, the reference line can be set with high accuracy. In this case, the method can also be applied to a case where the crack does not have a shape of deflection that is periodically repeated.

Advantageous Effects of Invention

With one aspect of the present invention, it is possible to provide a laser processing device and a laser processing method capable of inhibiting the line to cut from deviating with respect to the crystal orientation of the substrate of the object to be processed and being set.

BRIEF DESCRIPTION OF DRAWINGS

FIG. 9(a) is a graph illustrating an example of a relationship between a crank period and an angle formed by a candidate line with respect to a crystal orientation. FIG. 9(b) is a graph illustrating an example of a relationship between a length of the half cut and an appearance frequency of a crank shape.

FIG. 11(a) is a photographic view illustrating the substrate front surface on which the half cut is formed in an enlarged manner. FIG. 11(b) is another plan view illustrating the substrate front surface on which the half cut is formed in an enlarged manner.

FIG. 15(a) is a plan view illustrating an example of the candidate line and the reference line set by the processing of FIG. 14. FIG. 15(b) is a graph for explaining setting of the reference line in the processing of FIG. 14.

FIG. 20 is a flowchart illustrating processing of setting the reference line in a laser processing method according to a third embodiment.

FIG. 21(a) is a diagram illustrating an example of a processing result of the laser processing method according to the third embodiment. FIG. 21(b) is a diagram illustrating another example of the processing result of the laser processing method according to the third embodiment.

DESCRIPTION OF EMBODIMENTS

Figure 1:
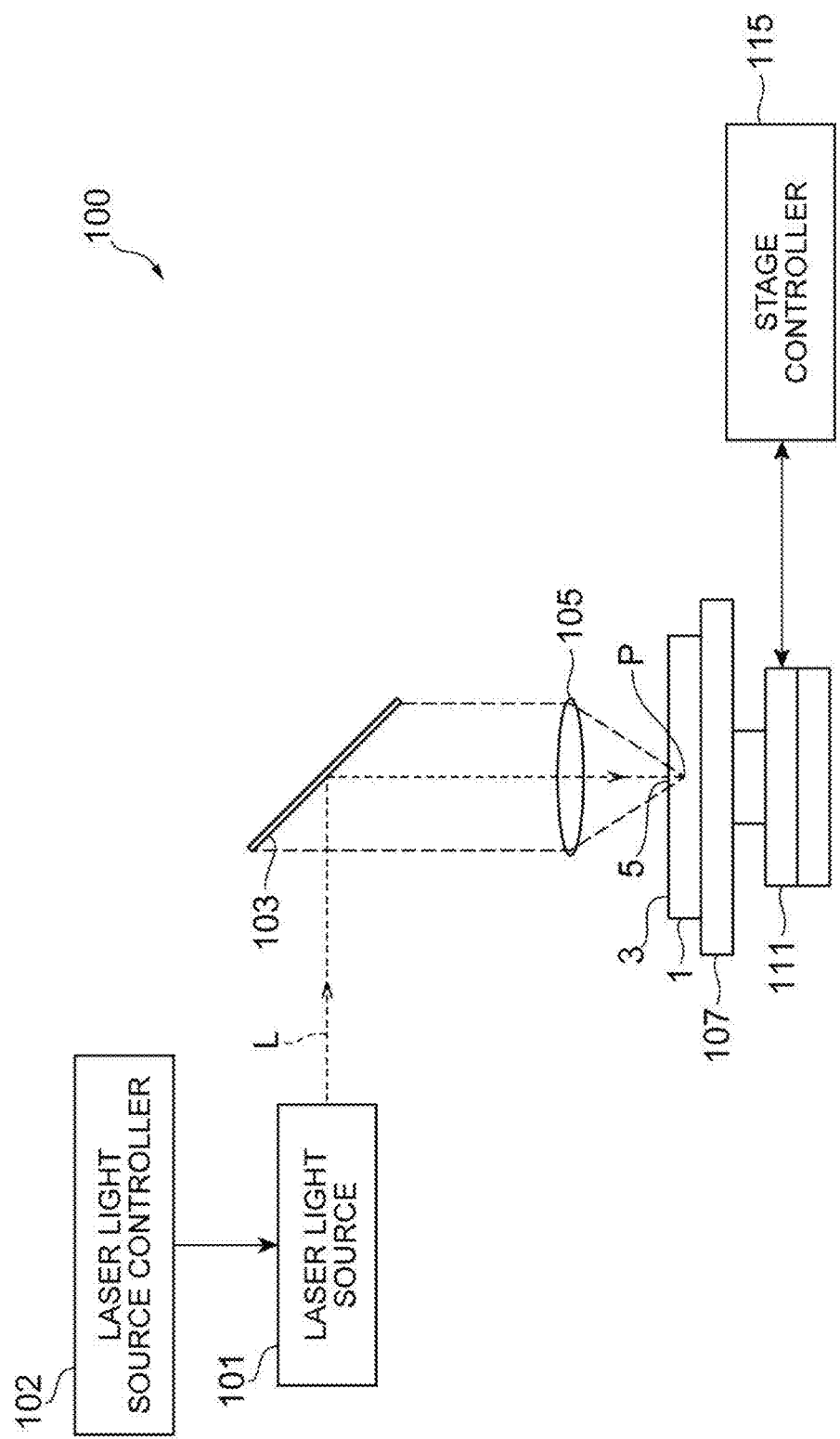
FIG. 1 is a schematic configuration diagram of a laser processing device used for forming a modified region.

In the following, embodiments of the present invention will be described in detail with reference to drawings. In the drawings, the same or equivalent parts will be denoted by the same reference signs, without redundant description.

Laser processing devices and laser processing methods according to the embodiments converge the laser light at the object to be processed, thereby forming a modified region on the object to be processed along a processing line (including a candidate line, a reference line, and a line to cut). Therefore, the forming of the modified region will be described at first with reference to FIGS. 1 to 6.

As illustrated in FIG. 1, a laser processing device 100 includes a laser light source 101 for causing laser light L to oscillate in a pulsating manner, a dichroic mirror 103 arranged to change a direction of the optical axis (optical path) of the laser light L by 90°, and a converging lens 105 for converging the laser light L. The laser processing device 100 further includes a support table 107 for supporting an object to be processed 1 that is irradiated with the laser light L converged by the converging lens 105, a stage 111 for moving the support table 107, a laser light source controller 102 for regulating the laser light source 101 in order to adjust the output, pulse width, pulse waveform, and the like of the laser light L, and a stage controller 115 for regulating the movement of the stage 111.

In the laser processing device 100, the laser light L emitted from the laser light source 101 changes the direction of its optical axis by 90° with the dichroic mirror 103 and then is converged by the converging lens 105 inside the object to be processed 1 mounted on the support table 107. At the same time, the stage 111 is moved, so that the object to be processed 1 moves with respect to the laser light L along a processing line 5. Accordingly, the modified region along the processing line 5 is formed in the object to be processed 1. While the stage 111 is moved here for relatively moving the laser light L, the converging lens 105 may be moved instead or together therewith.

Figure 2:
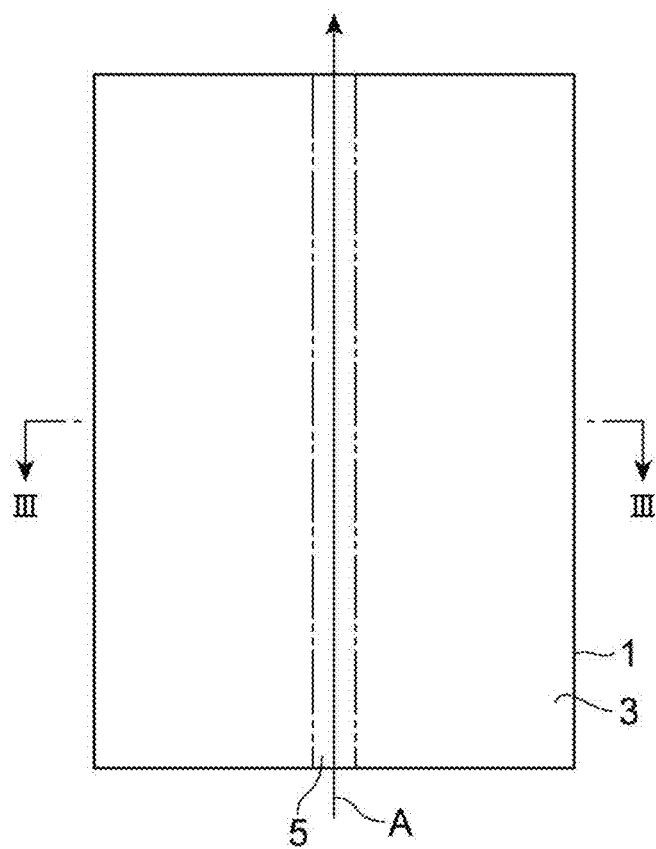
FIG. 2 is a plan view of an object to be processed for which the modified region is formed.
Figure 3:
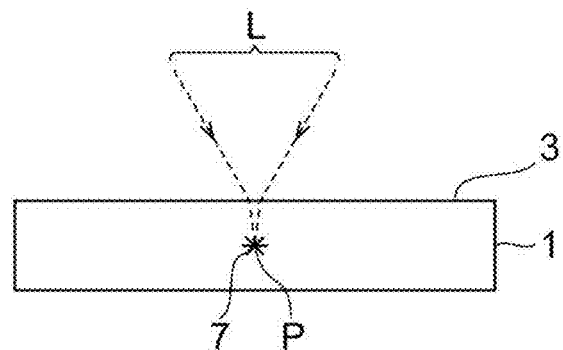
FIG. 3 is a sectional view of the object to be processed taken along the line III-III of FIG. 2.
Figure 4:
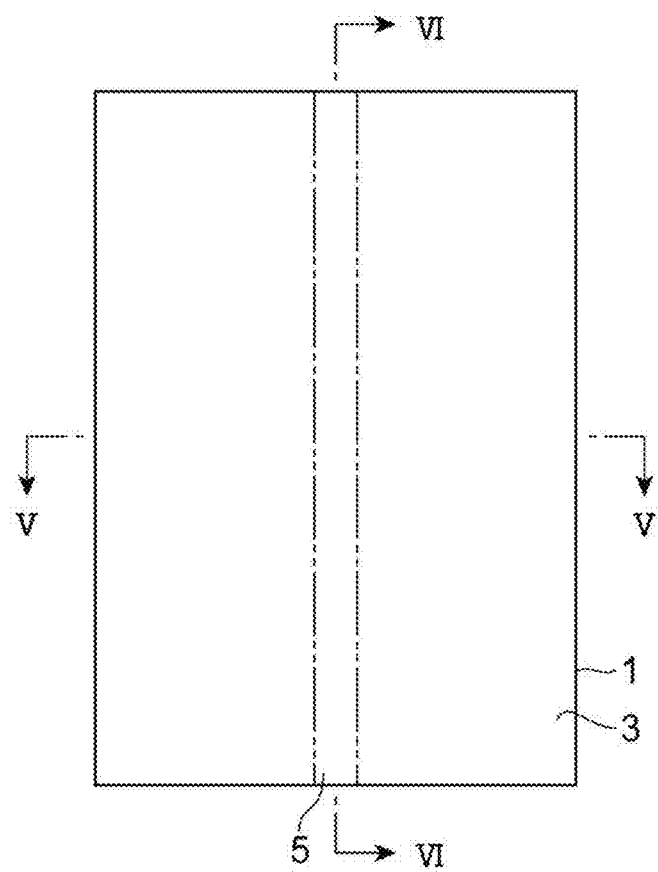
FIG. 4 is a plan view of the object to be processed after laser processing.
Figure 5:
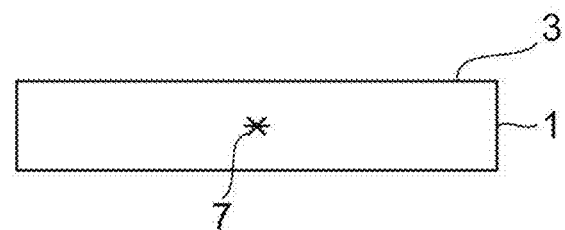
FIG. 5 is a sectional view of the object to be processed taken along the line V-V of FIG. 4.
Figure 6:
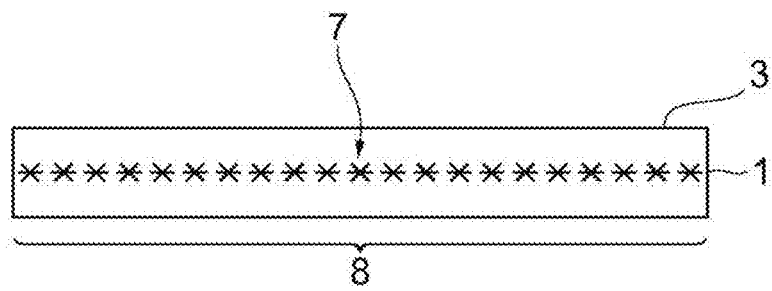
FIG. 6 is a sectional view of the object to be processed taken along the line VI-VI of FIG. 4.

Employed as the object to be processed 1 is a planar member (e. g., a substrate or a wafer), examples of which include semiconductor substrates formed of semiconductor materials and piezoelectric substrates formed of piezoelectric materials. As illustrated in FIG. 2, the line to cut is set for cutting the object to be processed 1, as the processing line 5, for the object to be processed 1. The processing line 5 is a virtual line extending straight. In a case where the modified region is formed inside the object to be processed 1, the laser light L is relatively moved along the processing line 5 (that is, in the direction of arrow A in FIG. 2) while locating a converging point (converging position) P inside the object to be processed 1, as illustrated in FIG. 3. Accordingly, as illustrated in FIGS. 4, 5 and 6, a modified region 7 is formed in the object to be processed 1 along the processing line 5. In a case where the processing line 5 is the line to cut, the modified region 7 formed along the processing line 5 is a cutting start point region 8.

A converging point P is a position at which the laser light L is converged. The processing line 5 may be curved instead of being straight, a three-dimensional one combining them, or one specified by coordinates. The processing line 5 may be one actually drawn on a front surface 3 of the object to be processed 1 without being restricted to the virtual line. The modified region 7 may be formed either continuously or intermittently. The modified region 7 may be formed in either rows or dots, and is only required to be formed at least inside the object to be processed 1. The crack may be formed from the modified region 7 as a start point, and the crack and the modified region 7 may be exposed at an outer surface (the front surface 3, a back surface 21, or an outer peripheral surface) of the object to be processed 1. A laser light entrance surface in forming the modified region 7 is not limited to the front surface 3 of the object to be processed 1 but may be the back surface 21 of the object to be processed 1.

Incidentally, in a case where the modified region 7 is formed inside the object to be processed 1, the laser light L is transmitted through the object to be processed 1 and is absorbed especially near the converging point P located inside the object to be processed 1. Accordingly, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 of the object to be processed 1, the laser light L is particularly absorbed near the converging point P located on the front surface 3, and removal portions such as holes and grooves are formed (surface absorption type laser processing) by being melted from the front surface 3 and removed.

The modified region 7 is a region in which density, refractive index, mechanical strength and other physical characteristics are different from the surroundings. Examples of the modified region 7 include molten processed regions (meaning at least one of regions resolidified after having being once molten, those in the molten state, and those in the process of resolidifying from the molten state), crack regions, dielectric breakdown regions, refractive index changed regions, and their mixed regions. Other examples of the modified region 7 include regions where the density of the modified region 7 has changed from that of an unmodified region and regions formed with a lattice defect in a material of the object to be processed 1 (which may also collectively be referred to as high dislocation density regions).

The molten processed regions, refractive index changed regions, regions where the modified region 7 has a density different from that of the unmodified region, and regions formed with a lattice defect may further incorporate a crack (cut or microcrack) therewithin or at an interface between the modified region 7 and the unmodified region. The incorporated crack may be formed over the whole surface of the modified region 7 or in only a part or a plurality of parts thereof. The object to be processed 1 includes a substrate made of a crystalline material having a crystal structure. For example, the object to be processed 1 includes a substrate formed of at least one of gallium nitride (GaN), silicon (Si), silicon carbide (SiC), $LiTaO_3$, and sapphire ($Al_2O_3$). In other words, the object to be processed 1 includes, for example, a gallium nitride substrate, a silicon substrate, a SiC substrate, a $LiTaO_3$ substrate, or a sapphire substrate. The crystalline material may be either an anisotropic crystal or an isotropic crystal.

In the embodiment, the modified region 7 can be formed by forming a plurality of modified spots (processing marks) along the processing line 5. In this case, the plurality of modified spots gathers to be the modified region 7. The modified spot is a modified portion formed by a shot of one pulse of pulsed laser light (that is, laser irradiation of one pulse: laser shot). Examples of the modified spots include crack spots, molten processed spots, refractive index changed spots, and those in which at least one of them is mixed. As for the modified spots, their sizes and lengths of cracks occurring therefrom can be controlled as necessary in view of the required cutting accuracy, the demanded flatness of cut surfaces, the thickness, kind, and crystal orientation of the object to be processed 1, and the like. In addition, in the present embodiment, the modified spot can be formed as the modified region 7, along the processing line 5.

In the embodiment, the modified region 7 is formed along the candidate line inside the object to be processed 1, and a crack (hereinafter referred to as "half cut") reaching the front surface 3 or the back surface 21 from the modified region 7, is formed along the candidate line. On the basis of a state of the half cut, the crystal orientation of the object to be processed 1 is identified, and the reference line is set that is a line indicating the crystal orientation. A principle of identifying the crystal orientation of the object to be processed 1 and setting the reference line will be described below.

Figure 7:
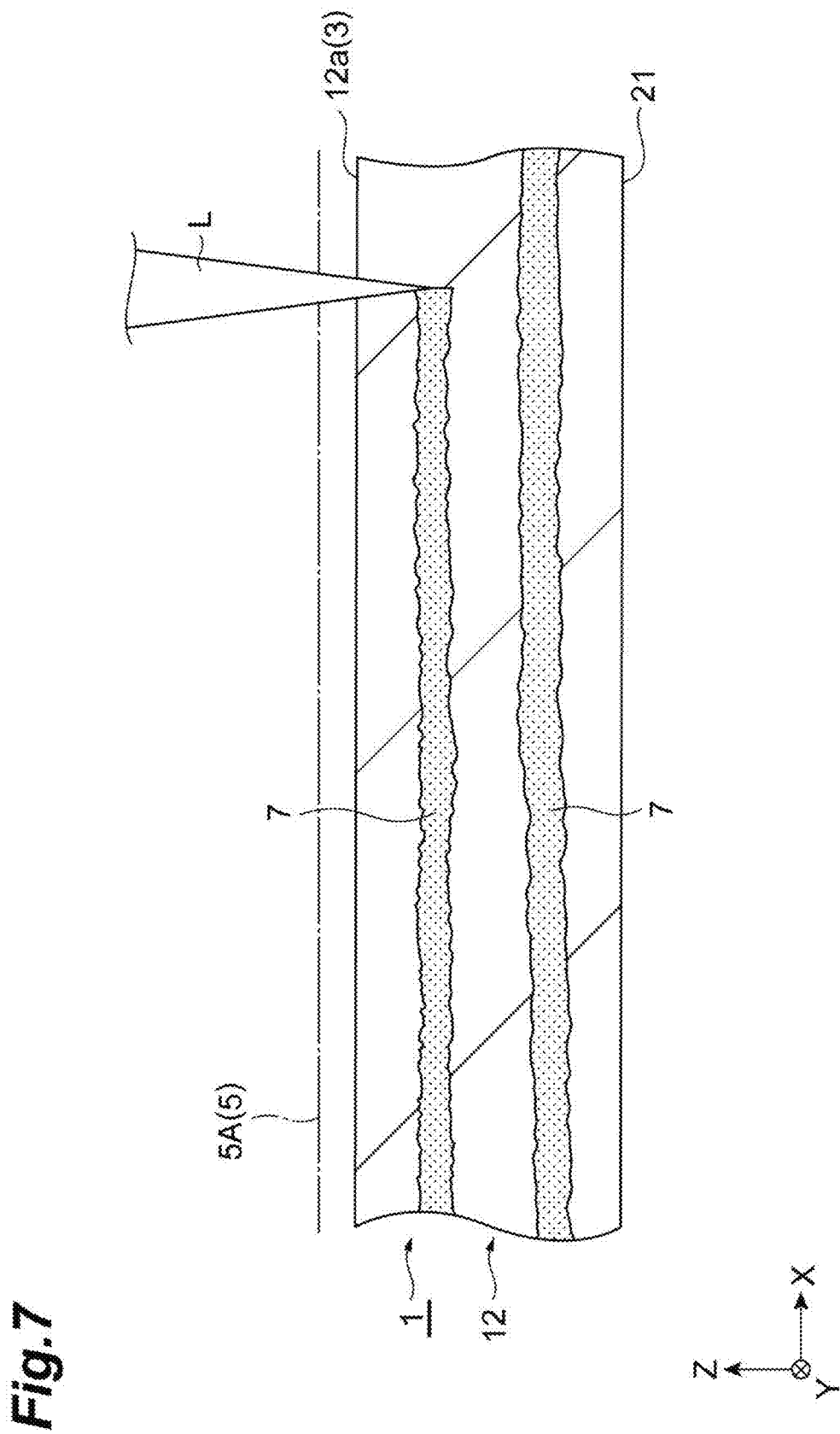
FIG. 7 is a sectional view of the object to be processed for explaining laser processing along a candidate line.

As illustrated in FIG. 7, a candidate line 5A is set for the object to be processed 1 including a substrate 12 of the crystalline material. The converging point P is aligned with the inside of the object to be processed 1, and the laser light L is emitted to a front surface 12a of the substrate 12 as the laser light entrance surface, along the candidate line 5A. Accordingly, one or more rows (two rows in the example illustrated) of modified regions 7 are formed inside the substrate 12 in the thickness direction, along the candidate line 5A. Along with this, the half cut that is a surface crack extending from the modified region 7 to the front surface 12a, is generated along the candidate line 5A. Incidentally, the Z direction illustrated is a direction corresponding to the thickness direction of the object to be processed 1, the X direction is a direction perpendicular to the Z direction, and the Y direction is a direction orthogonal to both the Z direction and the Y direction (the same applies hereinafter).

Figure 8:
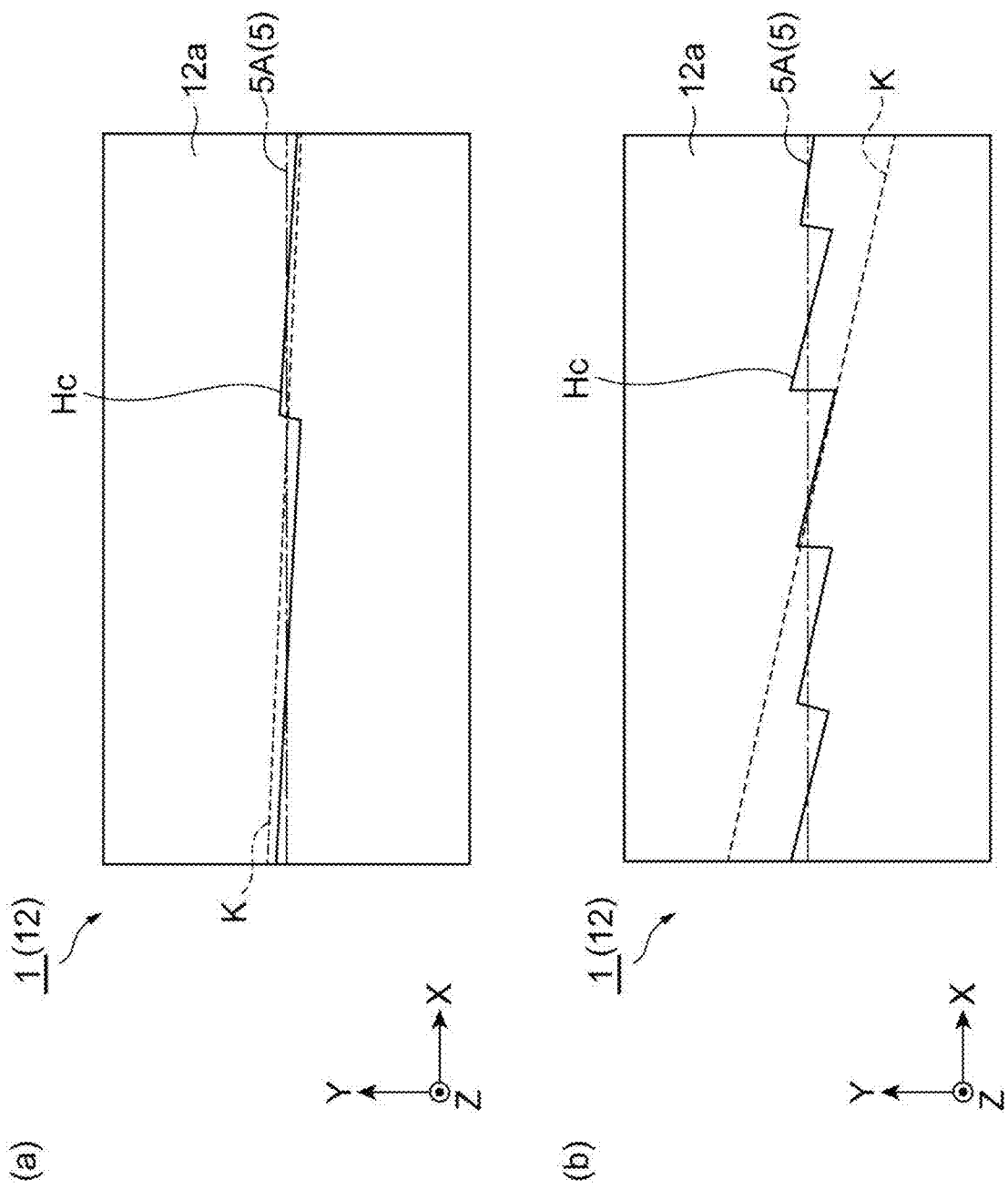
FIG. 8(a) is a plan view illustrating a first example of a substrate front surface on which a half cut is formed.
FIG. 8(b) is a plan view illustrating a second example of the substrate front surface on which the half cut is formed.

FIGS. 8(a) and 8(b) are diagrams each illustrating an example of a half cut Hc as viewed from the front surface 12a. The example of FIG. 8(b) illustrates a case where an angular deviation Δθ that is an angle at which an extending direction of the candidate line 5A deviates with respect to a direction of a crystal orientation K of the substrate 12 is larger than the angle of the example of FIG. 8(a). For example, in a case where the substrate 12 is a SiC substrate, the crystal orientation K is the crystal orientation K of its m-plane.

As illustrated in FIGS. 8(a) and 8(b), the half cut Hc is constituted by periodically repeated shapes each extending in the circumferential direction to be deflected in one direction crossing the extending direction of the candidate line 5A, as viewed from the front surface 12a. The half cut Hc has a shape in which a crank shape that is a shape of deflection, that is, a sawtooth shape extending to be inclined with respect to the candidate line 5A and then bending in a direction crossing the candidate line 5A, is periodically repeated.

It is found that, in a case where the angular deviation Δθ is large, a degree of deflection of the half cut Hc is smaller than in a case where the angular deviation Δθ is small. The degree of deflection is an index value representing an extent of deflection. The degree of deflection includes, for example, a period of deflection, a frequency of deflection, and an amount of deflection. Specifically, the degree of deflection includes a crank period (period of deflection) that is a length (interval) in a direction along the candidate line 5A in one crank shape, and an appearance frequency (frequency of deflection) of the crank shape per predetermined length of the half cut Hc.

In a case where the angular deviation Δθ is large, the crank period is smaller, and the appearance frequency of the crank shape per predetermined length of the half cut Hc is higher than in a case where the angular deviation Δθ is small. Accordingly, it is found that a degree between a magnitude of the angular deviation Δθ and the half cut Hc has a certain correlation. Specifically, it is found that the smaller the angular deviation Δθ is (the closer the extending direction of the candidate line 5A is to the crystal orientation K), the larger the crank period is, and the lower the appearance frequency of the crank shape is.

FIG. 9(a) is a graph illustrating an example of a relationship between an angle formed by the candidate line 5A with respect to the crystal orientation K, and the crank period that is the degree of deflection of the half cut Hc. FIG. 9(b) is a graph illustrating an example of a relationship between a coordinate of the candidate line 5A, and the appearance frequency of the crank shape that is the degree of deflection of the half cut Hc. A distance between coordinates corresponding to a difference between the appearance frequencies of the crank shape corresponds to the length between the cranks, that is, the crank period. In the figure, the angle formed by the candidate line 5A with respect to the crystal orientation K (hereinafter simply referred to as the "angle of the candidate line 5A") is the angle of when an angle of a standard processing line determined as the standard setting is 0°. The standard processing line is, for example, a line parallel to an orientation flat of the object to be processed 1. The crank period here is an average value of a predetermined number of crank periods. The crank period is represented as a relative value based on a certain crank period as a reference.

As illustrated in FIG. 9(a), by changing the angle of the candidate line 5A, the crank period changes. Accordingly, considering the above finding that the angular deviation Δθ decreases as the crank period is larger and the direction of the processing line 5 approaches the direction of the crystal orientation K, it can be seen that the crystal orientation K can be obtained from the candidate line 5A having a large crank period. In the example illustrated, the angle of the candidate line 5A and the crank period are inversely proportional to each other. An optimum angle of the candidate line 5A is −0.05°, and in this case, a direction rotated by −0.05° from a direction of the standard processing line can be identified as the crystal orientation K, and the candidate line 5A rotated by −0.05° from the standard processing line can be set as a reference line 5B.

As illustrated in FIG. 9(b), the larger the angular deviation Δθ is, the higher the appearance frequency of the crank shape is (the shorter the crank period is), per predetermined length of the half cut Hc. Accordingly, it can be seen that the crystal orientation K can be obtained from the candidate line 5A having a low appearance frequency of the crank shape.

Figure 10:
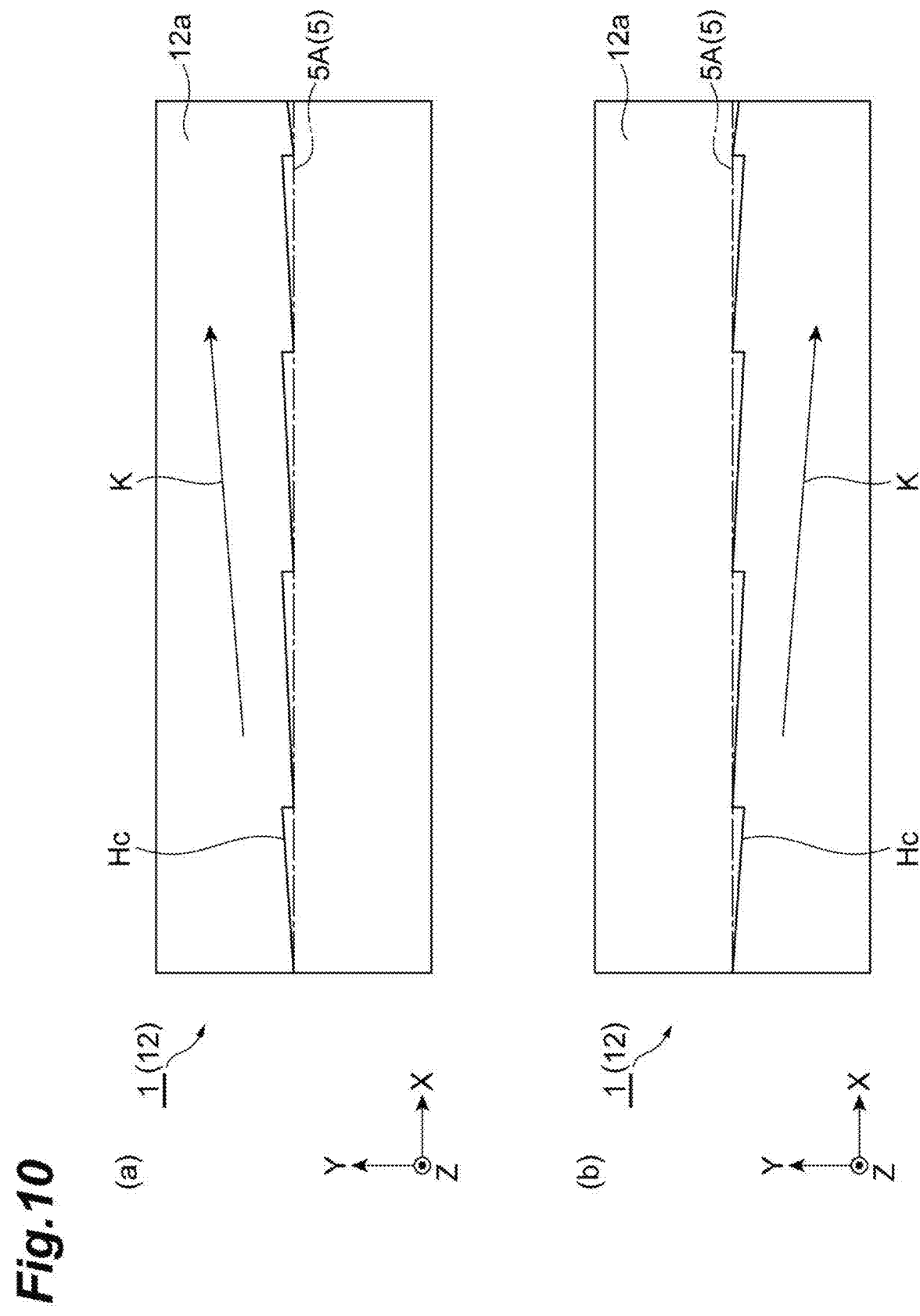
FIG. 10(a) is a plan view illustrating a third example of the substrate front surface on which the half cut is formed.
FIG. 10(b) is a plan view illustrating a fourth example of the substrate front surface on which the half cut is formed.

FIGS. 10(a) and 10(b) are views each illustrating another example of the half cut Hc as viewed from the front surface 12a. In the example of FIG. 10(a) and the example of FIG. 10(b), directions of the angular deviation Δθ with respect to the candidate line 5A are different from each other. In a case of being divided into one side and the other side by the candidate line 5A, when the crank shape of the half cut Hc has a shape extending to be inclined to the one side of the candidate line 5A, as illustrated in FIG. 10(a), the direction of the crystal orientation K is inclined to the one side with respect to the candidate line 5A. When the crank shape of the half cut Hc has a shape extending to be inclined to the other side of the candidate line 5A, as illustrated in FIG. 10(b), the direction of the crystal orientation K is inclined to the other side with respect to the candidate line 5A.

FIGS. 11(a) and 11(b) are photographic views each illustrating an example of the half cut Hc as viewed from the front surface 12a in an enlarged manner. In the example in the figure, the substrate 12 is a SiC substrate, and a street region 17 described later is illustrated. The candidate line 5A is set, on the street region 17, parallel to an extending direction of the street region 17. The half cut Hc illustrated in FIG. 11(a) has a shape in which the crank shape extends upward with respect to the candidate line 5A. In this case, the direction of the crystal orientation K has a counterclockwise angular deviation Δθ with respect to the candidate line 5A as viewed from the front surface 12a. The half cut Hc illustrated in FIG. 11(b) has a shape in which the crank shape extends downward with respect to the candidate line 5A. In this case, the direction of the crystal orientation K has a clockwise angular deviation Δθ with respect to the candidate line 5A as viewed from the front surface 12a.

As described above, in the embodiment, a direction of the candidate line 5A can be identified as the crystal orientation K, in which the candidate line has the smallest degree of deflection of the half cut Hc (for example, the largest crank period, or the lowest appearance frequency of the crank shape) out of a plurality of the candidate lines 5A. The candidate line 5A can be set as the reference line 5B indicating the direction of the crystal orientation K.

Search is performed for the candidate line 5A in which the degree of deflection of the half cut Hc falls within a predetermined range (for example, the crank period is equal to or greater than a threshold value, or the appearance frequency of the crank shape is equal to or less than a certain value). The direction of the candidate line 5A found can be identified as the crystal orientation K. The candidate line 5A can be set as the reference line 5B. A direction of an angle of the crystal orientation K with respect to the candidate line 5A can be identified from a direction of deflection of the half cut Hc (inclination direction of the crank shape with respect to the candidate line 5A). In other words, on the basis of whether the half cut Hc extends upward or downward with respect to the candidate line 5A, it can be identified whether the angular deviation Δθ of the crystal orientation K with respect to the candidate line 5A is in the positive direction or the negative direction.

Figure 12:
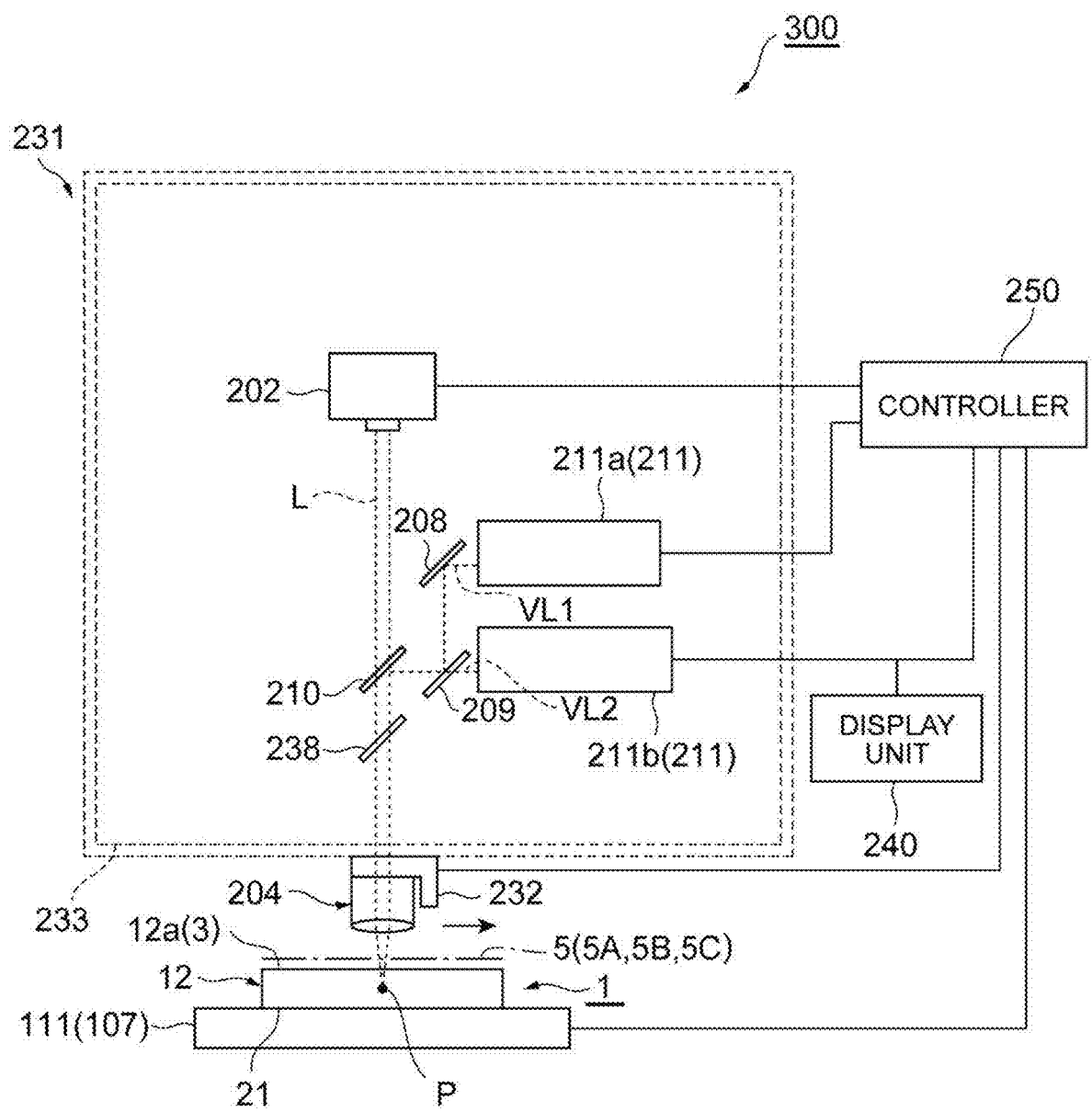
FIG. 12 is a schematic configuration diagram illustrating a laser processing device according to a first embodiment.

Next, a laser processing device of a first embodiment will be described with reference to the schematic configuration diagram of FIG. 12.

Figure 16:
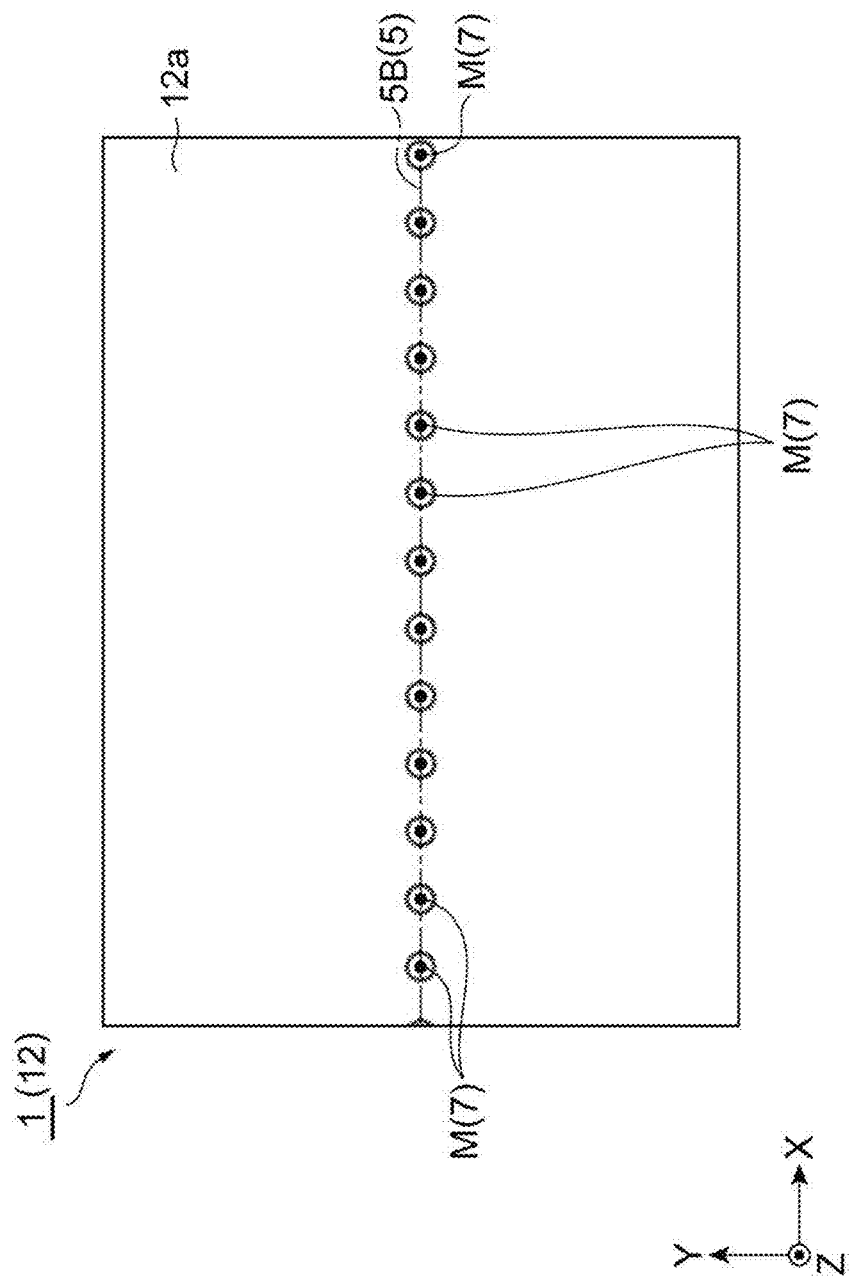
FIG. 16 is a plan view illustrating an example of the substrate front surface on which marking is performed.

A laser processing device 300 converges the laser light L at the object to be processed 1 to form the modified region 7 in the object to be processed 1 along the processing line 5 (including the candidate line 5A, the reference line 5B, and the line to cut 5C). In addition, the laser processing device 300 converges the laser light L at the front surface 12a of the substrate 12 in the object to be processed 1 to perform marking for forming marks M that are a plurality of dent marks along the processing line 5 (see FIG. 16). The plurality of marks M along the processing line 5 is arranged side by side along the processing line 5 at intervals corresponding to, for example, a pulse pitch (relative speed of the pulse laser light to the object to be processed 1/repetition period of the pulse laser light). The plurality of marks M is a reference mark indicating the crystal orientation K. The marks M here are constituted by a modified spot (modified region 7) formed to be exposed on the front surface 12a.

The laser processing device 300 includes a laser light source 202, a converging optical system 204, and a surface observation unit (imaging unit) 211. The laser light source 202, the converging optical system 204, and the surface observation unit 211 are provided in a housing 231. The laser light source 202 emits the laser light L having a wavelength that is transmitted through the object to be processed 1. The wavelength is, for example, 532 nm to 1500 nm. The laser light source 202 is, for example, a fiber laser or a solid laser. The converging optical system 204 converges the laser light L emitted from the laser light source 202, inside the object to be processed 1. The converging optical system 204 includes a plurality of lenses. The converging optical system 204 is installed on a bottom plate 233 of the housing 231 via a drive unit 232 including a piezoelectric device and the like.

In the laser processing device 300, the laser light L emitted from the laser light source 202 is sequentially transmitted through the dichroic mirrors 210 and 238 to enter the converging optical system 204, and is converged by the converging optical system 204 into the object to be processed 1 mounted on the support table 107 on the stage 111.

The surface observation unit 211 observes the laser light entrance surface of the object to be processed 1. The surface observation unit 211 images the front surface 12a of the substrate 12 in the object to be processed 1 supported by the support table 107. The surface observation unit 211 includes an observation light source 211a and a detector 211b. The observation light source 211a emits the visible light VL1. The observation light source 211a is not particularly limited, and a known light source can be used.

The detector 211b detects reflected light VL2 of the visible light VL1 reflected by the laser light entrance surface of the object to be processed 1, to acquire an image of the front surface 12a (hereinafter simply referred to as a "surface image"). The detector 211b acquires a surface image including the half cut Hc. In addition, the detector 211b acquires a surface image including the plurality of marks M. The detector 211b is not particularly limited, and a known imaging device such as a camera can be used.

In the surface observation unit 211, the visible light VL1 emitted from the observation light source 211a is reflected by or transmitted through a mirror 208 and dichroic mirrors 209, 210, and 238, to be converged by the converging optical system 204 toward the object to be processed 1. The reflected light VL2 reflected by the laser light entrance surface of the object to be processed 1 is converged by the converging optical system 204, to be transmitted through or reflected by the dichroic mirrors 238 and 210, and then transmitted through the dichroic mirror 209, to be received by the detector 211b.

The laser processing device 300 includes a display unit 240 for displaying the surface image imaged by the surface observation unit 211, and a controller 250 for controlling the laser processing device 300. As the display unit 240, a monitor or the like can be used.

The controller 250 includes, for example, a CPU, ROM, RAM, and the like. The controller 250 controls the laser light source 202, to adjust the output, pulse width, and the like of the laser light L emitted from the laser light source 202. When forming the modified region 7, the controller 250 controls at least one of the housing 231, a position of the stage 111 (support table 107), and driving of the drive unit 232, to position the converging point P of the laser light L on the front surface 3 (front surface 12a) of the object to be processed 1, or at a position within the predetermined distance from the front surface 3 (or the back surface 21).

When forming the modified region 7, the controller 250 controls at least one of the housing 231, the position of the stage 111, and the driving of the drive unit 232, to relatively move the converging point P along the processing line 5.

The controller 250 sets the plurality of candidate lines 5A extending in mutually different directions for the object to be processed 1. The controller 250 controls operation of at least one of the stage 111 (support table 107), the laser light source 202, and the drive unit 232 (converging optical system 204) such that the modified region 7 is formed inside the substrate 12 and the half cut Hc is formed, along each of the plurality of candidate lines 5A.

The controller 250 controls operation of the surface observation unit 211 to image the surface image. The controller 250 determines the reference line 5B on the basis of the surface image imaged by the surface observation unit 211, and sets the reference line 5B for the object to be processed 1. Specifically, image recognition processing is performed to a plurality of the surface images including the half cut Hc, and the candidate line 5A having the smallest degree of deflection of the half cut Hc out of a predetermined number of candidate lines 5A is set as the reference line 5B indicating the crystal orientation K of the substrate 12 for the object to be processed 1. Here, the crank period of each of a plurality of the half cuts Hc is recognized from the surface images, and the candidate line 5A corresponding to the half cut Hc having the largest crank period is set as the reference line 5B. The image recognition processing performed by the controller 250 is not particularly limited, and well-known image recognition processing such as pattern recognition or the like can be adopted.

The controller 250 controls operation of at least one of the stage 111, the laser light source 202, and the drive unit 232 such that the plurality of marks M (see FIG. 16) is formed on the object to be processed 1 along the reference line 5B.

The controller 250 performs image recognition processing to the surface image including the plurality of marks M and recognizes an arrangement direction of the marks M. The controller 250 identifies the crystal orientation K on the basis of the arrangement direction of the marks M recognized and aligns the line to cut 5C. For example, the controller 250 sets the line to cut 5C or changes the existing line to cut 5C such that the line to cut 5C is parallel to the arrangement direction of the marks M (parallel to the crystal orientation K).

The controller 250 sets the line to cut 5C passing through the street region 17 described later of the object to be processed 1. In a case where the extending direction of the street region 17 does not match the crystal orientation K, the controller 250 sets, for the object to be processed 1, the line to cut 5C parallel to the crystal orientation K and inclined with respect to the extending direction of the street region 17.

Figure 13:
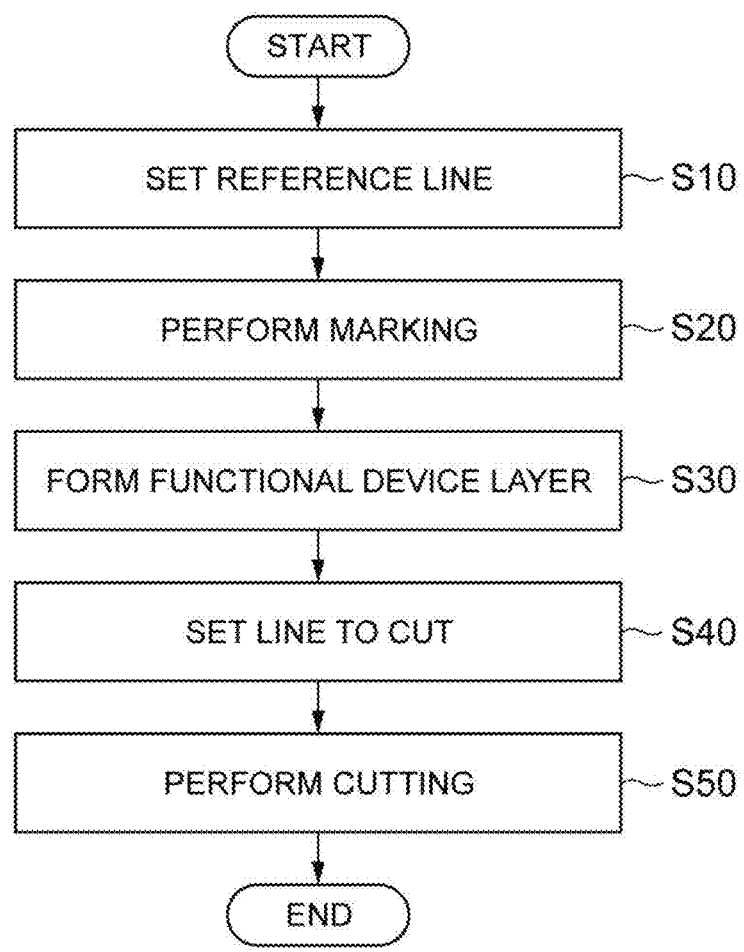
FIG. 13 is a flowchart illustrating a laser processing method according to the first embodiment.
Figure 14:
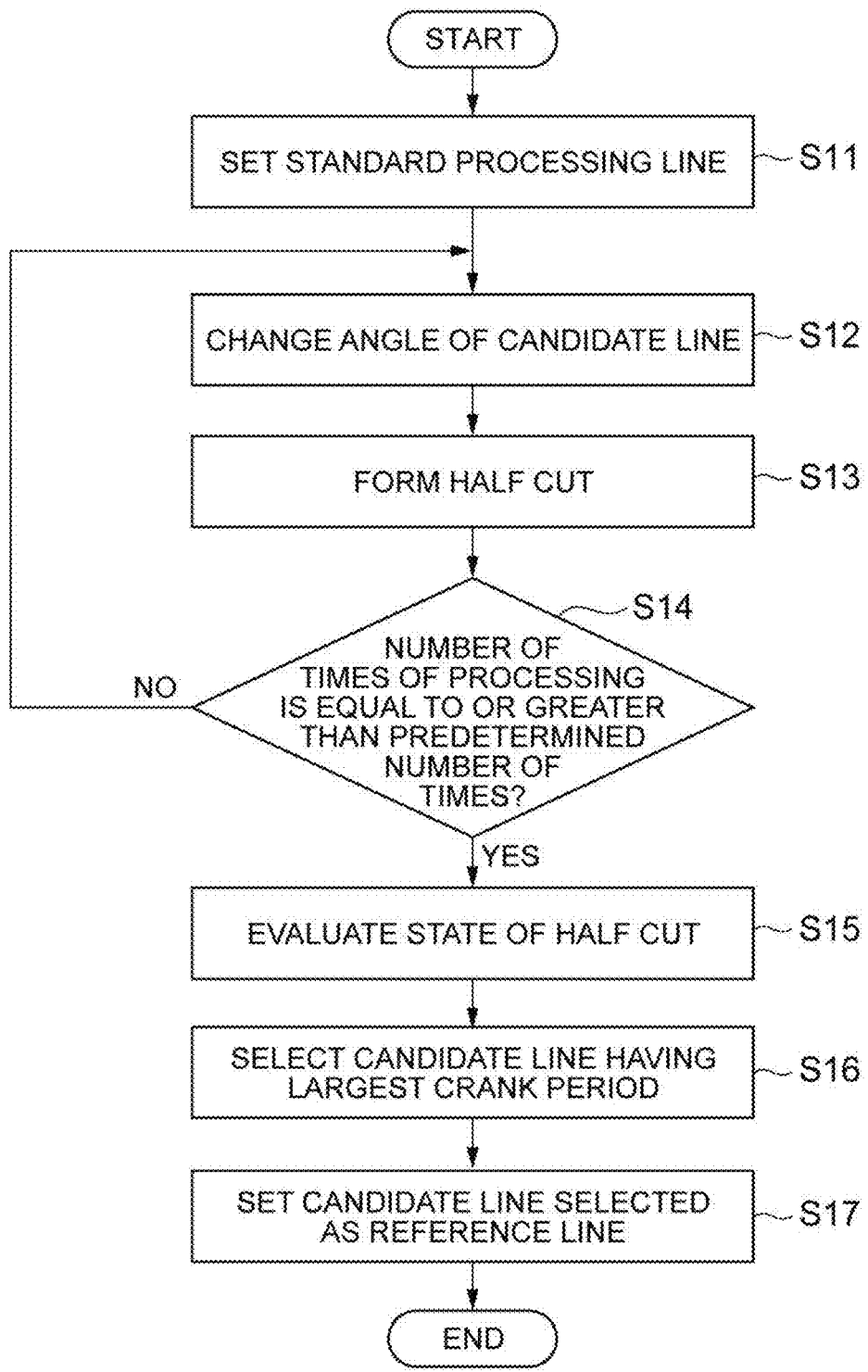
FIG. 14 is a flowchart illustrating processing of setting a reference line in the laser processing method according to the first embodiment.

Next, a laser processing method performed in the laser processing device 300 will be described with reference to the flowcharts of FIGS. 13 and 14.

The laser processing method of the present embodiment is used, for example, in a manufacturing method for manufacturing a semiconductor chip such as a light emitting diode. In an object to be processed cutting method according to the present embodiment, first, the object to be processed 1 is prepared. As illustrated in FIG. 15(a), the object to be processed 1 is a bare wafer and includes the substrate 12. On the substrate 12, an orientation flat OF is provided. The substrate 12 includes an ineffective region 16x provided on an outer edge portion on the front surface 12a and an effective region 16y provided inside the ineffective region 16x. The effective region 16y is a region where a functional device layer 15 described later is provided. The ineffective region 16x is a region where the functional device layer 15 is not provided.

Subsequently, the reference line 5B is set for the object to be processed 1 (S10). Specifically, first, the substrate 12 is mounted on the support table 107 of the stage 111. The controller 250 sets the candidate line 5A parallel to the orientation flat OF (or inclined by a reference angle in the θ direction) as the standard processing line (S11). The controller 250 changes the angle of the candidate line 5A in the θ direction such that the angle of the candidate line 5A deviates by a specified angle in the θ direction with respect to the standard processing line (S12). The θ direction is a rotation direction with the Z direction as an axial direction. The reference angle and the specified angle are predetermined angles set in advance, and are not particularly limited, and can be obtained from the specification or state of the substrate 12, for example.

Subsequently, along the candidate line 5A in the ineffective region 16x, the laser light L is scanned one or multiple times while being converged inside the substrate 12, and one or more rows of the modified region 7 are formed inside the substrate 12 in the ineffective region 16x. Accordingly, the half cut Hc reaching the front surface 12a of the substrate 12 in the ineffective region 16x, is formed along the candidate line 5A (S13). In scanning of multiple times of the laser light L, scanning of the laser light L in the same direction (so-called one way processing) is repeated multiple times. Then, the surface image including the half cut Hc is imaged by the surface observation unit 211 and stored in a storage unit (ROM or RAM) of the controller 250. In the scanning of multiple times of the laser light L, the laser light L may be scanned to reciprocate along the candidate line 5A (so-called reciprocating processing).

Subsequently, laser processing according to S12 and S13 is repeatedly executed until the number of times of processing reaches a predetermined number of times set in advance (here, five times) (S14). In S12, which is repeated multiple times, the angle is changed such that the angle of the candidate line 5A in the θ direction does not become the same, and as a result, the predetermined number of candidate lines 5A extending in different predetermined directions are set.

Subsequently, the controller 250 performs image recognition processing to the plurality of surface images stored, and recognizes and evaluates a state of each of the plurality of half cuts Hc (S15). The controller 250 selects the half cut Hc having the largest crank period out of a plurality of the crank periods recognized. The controller 250 selects the candidate line 5A from the plurality of candidate lines 5A, in which the candidate line 5A is along the half cut Hc having the largest crank period (S16). Then, the controller 250 sets the candidate line 5A selected, as the reference line 5B indicating the crystal orientation K of the substrate 12, for the object to be processed 1 (S17). A direction (crystal orientation K) of the reference line 5B set is stored in the storage unit of the controller 250.

For example, in S16, as illustrated in FIG. 15(b), a candidate line 5G having the largest crank period is selected out of the five candidate lines 5A set in the ineffective region 16x. In this case, in S17, a direction of the candidate line 5G is determined as the crystal orientation K, and the reference line 5B parallel to the candidate line 5G is set in the ineffective region 16x. The direction of the reference line 5B can be represented as an angle (optimum angle) in the θ direction from a parallel direction of the orientation flat OF.

The reference line 5B is a line extending to deviate in the θ direction by the optimum angle from the parallel direction of the orientation flat OF, in the ineffective region 16x.

Subsequently, the plurality of marks M arranged along the reference line 5B is marked on the front surface 12a of the substrate 12 (S20). In 20, the laser light L is scanned while being converged at the front surface 12a of the substrate 12 along the reference line 5B in the ineffective region 16x, and the plurality of marks M is formed along the reference line 5B on the front surface 12a of the substrate 12 in the ineffective region 16x (see FIG. 16).

Subsequently, the substrate 12 is removed from the stage 111, and the functional device layer 15 is formed on the front surface 12a of the substrate 12 (S30). The functional device layer 15 includes a plurality of functional devices 15a (for example, a light receiving device such as a photodiode, a light emitting device such as a laser diode, or a circuit device formed as a circuit) arrayed in a matrix in the effective region 16y of the front surface 12a. The street region (dicing street) 17 is formed between the adjacent functional devices 15a.

In S30, the functional device layer 15 is formed, using the orientation flat OF as a reference. Specifically, the plurality of functional devices 15a arranged in the parallel direction and a vertical direction of the orientation flat OF is arrayed in the effective region 16y of the front surface 12a. The grid-like street region 17 extending in the parallel direction and the vertical direction of the orientation flat OF is formed between the plurality of functional devices 15a.

Subsequently, an expand tape is attached to the back surface 21 of the object to be processed 1 including the substrate 12 and the functional device layer 15, and the object to be processed 1 is mounted on the stage 111. The surface image including the plurality of marks M is imaged by the surface observation unit 211. The controller 250 recognizes the arrangement direction of the plurality of marks M from the surface image. The controller 250 identifies the arrangement direction of the plurality of marks M as the crystal orientation K. The controller 250 sets the line to cut 5C parallel to the arrangement direction of the marks M and passing through the street region 17, and the line to cut 5C orthogonal to the arranging direction of the marks M and passing through the street region 17 (S40). In other words, the grid-like line to cut 5C passing through the street region 17 between the plurality of functional devices 15a is set to extend along the parallel direction and an orthogonal direction of the crystal orientation K identified, by adjusting the angle in the θ direction.

Figure 17:
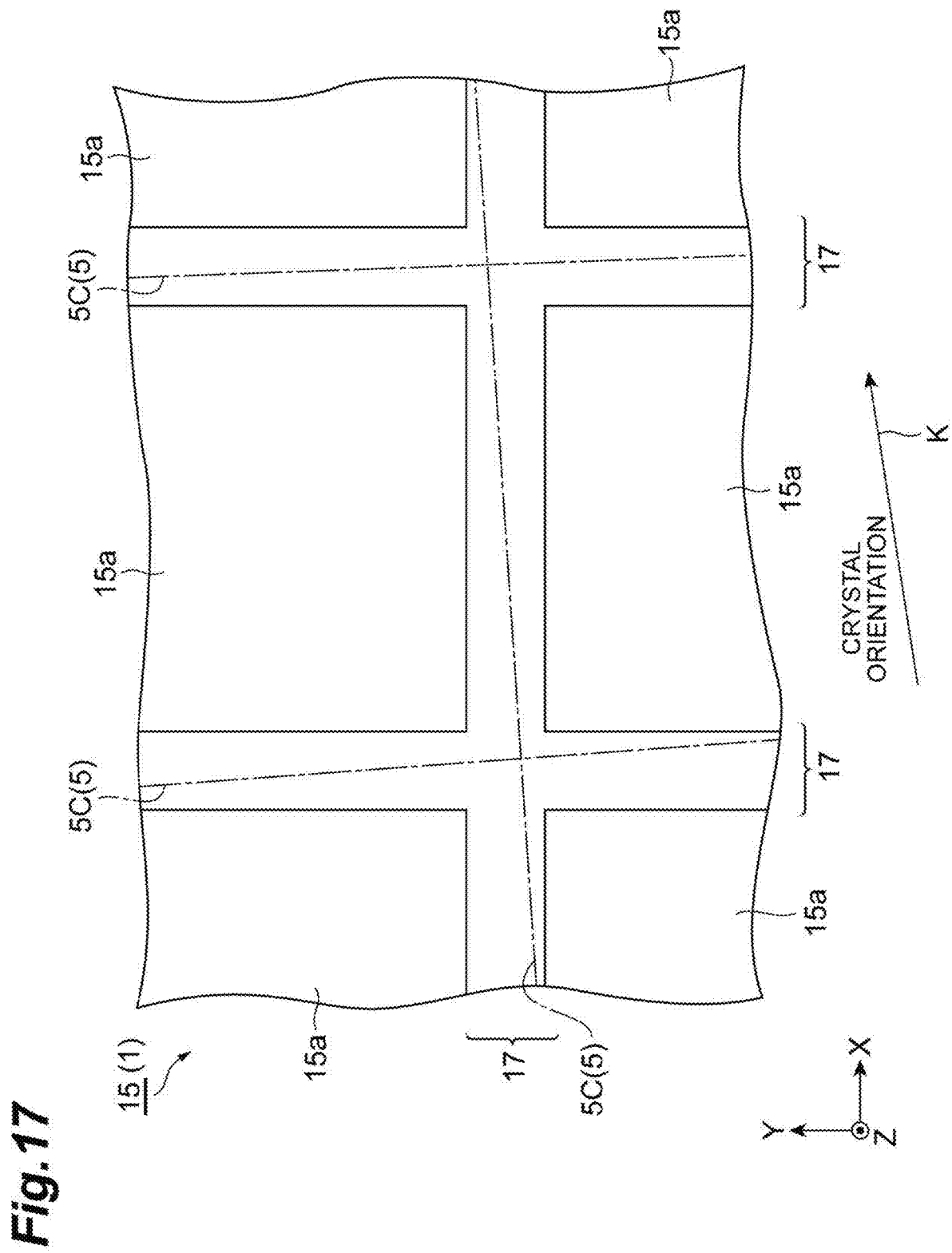
FIG. 17 is a plan view illustrating an example of the line to cut set in a street region in an enlarged manner.

FIG. 17 is a plan view illustrating the functional device layer 15 in an enlarged manner. As illustrated in FIG. 17, for example, in S40, the line to cut 5C is set to pass through the street region 17 of the object to be processed 1. In addition, the line to cut 5C is set, in the street region 17, to be along the parallel direction and the orthogonal direction of the crystal orientation K. In the example illustrated, the extending direction of the street region 17 (the direction in which the functional devices 15a are arranged) does not match the crystal orientation K. In this case, in S40, the line to cut 5C passing through the street region 17 is set to be inclined with respect to the extending direction of the street region 17 and to be parallel to the crystal orientation K as viewed from the Z direction. In addition, the line to cut 5C passing through the street region 17 is set to be inclined with respect to the extending direction of the street region 17 and to be vertical to the crystal orientation K as viewed from the Z direction.

Subsequently, the object to be processed 1 is cut along the line to cut 5C to form a plurality of semiconductor chips (for example, a memory, an IC, a light emitting device, and a light receiving device) (S50). Specifically, the laser light L is scanned one or multiple times along the line to cut 5C while being converged inside the object to be processed 1. Accordingly, one or more rows of the modified region 7 are formed inside the object to be processed 1, along the line to cut 5C. Then, by expanding the expand tape, the object to be processed 1 is cut along the line to cut 5C from the modified region 7 as a start point of cutting, to be separated from each other as the plurality of semiconductor chips.

Incidentally, it is found that the number of level differences increases that appears on the cut surface of the object to be processed 1 cut along the processing line 5, as the degree of deflection of the half cut Hc increases that occurs in a case where the modified region 7 is formed along the processing line 5. Under this finding, in the present embodiment, on the basis of the surface image including the half cut Hc along each of the plurality of candidate lines 5A extending in mutually different directions, the reference line 5B is set for the object to be processed 1.

Accordingly, it is possible to set the line to cut 5C extending in a direction parallel to the reference line 5B. As a result, it is possible to inhibit the line to cut 5C from deviating with respect to the crystal orientation K of the substrate 12 and being set. It is possible to inhibit the level difference from appearing in the cut surface (end surface) of the chip obtained by cutting the object to be processed 1, and to smooth the cut surface of the chip and eventually make a mirror surface. Further, the yield of the chip can be improved.

Incidentally, in general, directions of the orientation flat OF and the crystal orientation K may deviate from each other by about 1° at the maximum. Therefore, as compared with a case where the line to cut 5C is set parallel to the orientation flat OF, the present embodiment having the above-described effect is particularly effective.

In the present embodiment, the controller 250 sets the predetermined number of candidate lines 5A extending in mutually different predetermined directions, and sets the candidate line 5A having the smallest degree of deflection of the half cut Hc out of the predetermined number of candidate lines 5A, as the reference line 5B. Accordingly, it is sufficient that laser light L irradiation, confirmation of the state of the half cut Hc, and the like are performed only for the predetermined number of candidate lines 5A, so that setting of the reference line 5B can be simply performed.

In the present embodiment, the controller 250 sets, for the substrate 12, the predetermined number of candidate lines 5A extending in mutually different predetermined directions, using the orientation flat OF provided to the object to be processed 1 as a reference. That is, the standard processing line parallel to the orientation flat OF is set, and the predetermined number of candidate lines 5A are set, using the standard processing line as a reference. Accordingly, fluctuation in settings of the candidate lines 5A for each object to be processed 1 can be inhibited. In particular, in a case where matching accuracy is high between the direction of the orientation flat OF and the direction of the crystal orientation K, it is effective because the settings of the plurality of candidate lines 5A can be made only by fine adjustment from the standard processing line. Further, it is effective in a case where the chips are mass-produced from the object to be processed 1.

The present embodiment includes a display unit 260 that displays the surface image imaged by the surface observation unit 211. Accordingly, an operator can perform confirmation of the state of the half cut Hc, and the like.

In the present embodiment, the plurality of marks M is formed on the object to be processed 1 along the reference line 5B. Accordingly, it is possible to set, for the object to be processed 1, the line to cut 5C extending in the direction parallel to the reference line 5B, using the plurality of marks M as a reference.

In the present embodiment, the line to cut 5C extending in the direction parallel to the reference line 5B is set for the object to be processed 1, and the modified region 7 is formed inside the substrate 12 along the line to cut 5C. Accordingly, a series of steps such as laser light L irradiation along the candidate line 5A, confirmation of the state of the half cut Hc, setting of the reference line 5B, setting of the line to cut 5C, and laser light L irradiation along the line to cut 5C, can be performed on one laser processing device 300.

In the present embodiment, the candidate line 5A and the reference line 5B are set in the ineffective region 16x of the substrate 12, and the plurality of marks M is formed on the front surface 12a in the ineffective region 16x of the substrate 12. Accordingly, when manufacturing the chip by cutting the object to be processed 1, it is possible to effectively utilize a portion (ineffective region 16x) that is normally removed and discarded. The candidate line 5A and the reference line 5B may be set in the ineffective region 16x. The plurality of marks M may be formed in the effective region 16y.

In the present embodiment, when forming the plurality of rows of modified regions 7 along the candidate line 5A to form the half cut Hc, the laser light L is not scanned to reciprocate along the candidate line 5A, but the laser light L is repeatedly scanned multiple times in the same direction. Accordingly, the half cut Hc from the modified region 7 can suitably reach the front surface 12a, and deflection of the half cut Hc (crank shape) can be caused to occur noticeably.

The present embodiment is not limited to the above, and may be configured as follows.

In the present embodiment, the plurality of marks M arranged along the reference line 5B is formed as the reference mark; however, the reference mark to be formed is not particularly limited. For example, a new orientation flat (a plane formed on a part of the outer peripheral surface of the substrate 12) different from the orientation flat OF may be provided parallel to the reference line 5B as a reference mark. A surface cut by using the half cut Hc of the optimum candidate line 5A may be used as a new orientation flat as a reference mark. The modified region 7 may be formed inside the object to be processed 1 along the reference line 5B by the laser light L irradiation, and the surface cut from the modified region 7 as a start point may be used as a new orientation flat as a reference mark. Incidentally, various known processing methods can be adopted for forming the new orientation flat.

The reference mark may be a crack reaching the front surface 12a from the modified region 7 in the substrate 12. The reference mark may be constituted by a shape (including a two-dimensional shape and a three-dimensional shape) indicating a crystal orientation, a pattern, a color, a display, a one-dimensional code, a two-dimensional code, or the like, or a combination thereof. The reference mark may be a scribe line formed along the reference line 5B.

In the present embodiment, the controller 250 performs image recognition processing to the surface image of the substrate 12 to automatically recognize the degree of deflection of the half cut Hc; however, the degree of deflection of the half cut Hc may be recognized from the surface image displayed on the display unit 240 or visually by the operator. In this case, for example, in an operation unit connected to the controller 250, the operator may perform operation of setting the reference line 5B on the basis of the degree of deflection of the half cut Hc, to set the reference line 5B for the object to be processed 1.

In the present embodiment, the controller 250 performs the image recognition processing to the surface image of the substrate 12 to automatically recognize the plurality of marks M; however, the plurality of marks M may be recognized from the surface image displayed on the display unit 240 or visually by the operator. In this case, for example, in the operation unit connected to the controller 250, the operator may perform operation of setting the line to cut 5C parallel to the arrangement direction of the plurality of marks M, to set the line to cut 5C for the object to be processed 1.

In the present embodiment, in S30 in which the functional device layer 15 is formed on the front surface 12a of the substrate 12, the functional device layer 15 is formed, using the orientation flat OF as a reference; however, the functional device layer 15 may be formed, using the plurality of marks M as a reference. Specifically, the plurality of functional devices 15a arranged in the arrangement direction and its vertical direction of the plurality of marks M may be arrayed in the effective region 16y of the front surface 12a, and the grid-like street region 17 extending in the arrangement direction and its vertical direction of the plurality of marks M may be formed between the plurality of functional devices 15a. Accordingly, the plurality of functional devices 15a and the street region 17 can be accurately arranged along the crystal orientation K.

In the present embodiment, after S20 in which marking is performed on the substrate 12, S30 is performed in which the functional device layer 15 is performed; however, not limited thereto, the object to be processed 1 may be used in which the functional device 15a is formed in advance on the substrate 12 (so-called device-formed wafer). That is, after S10 in which the reference line 5B is set for the object to be processed 1 on which the functional device 15a is formed in advance on the substrate 12, S20 is performed in which marking is performed, and S40 may be immediately performed in which the line to cut is set. In this case, the line to cut 5C may be set to be parallel to the reference line 5B set, in S40, without performing S20 in which marking is performed.

Next, a second embodiment will be described. In the description of the second embodiment, points different from the first embodiment will be described.

In the present embodiment, on the basis of the surface image imaged by the surface observation unit 211, the controller 250 sequentially sets the plurality of candidate lines 5A for the object to be processed 1 until the degree of deflection of the half cut Hc falls within the predetermined range. The controller 250 sets the candidate line 5A of which the degree of deflection of the half cut Hc falls within the predetermined range, as the reference line 5B for the object to be processed 1. Here, the candidate line 5A is set as the reference line 5B, in which the candidate line 5A is along the half cut Hc having the crank period equal to or greater than the threshold value.

Figure 18:
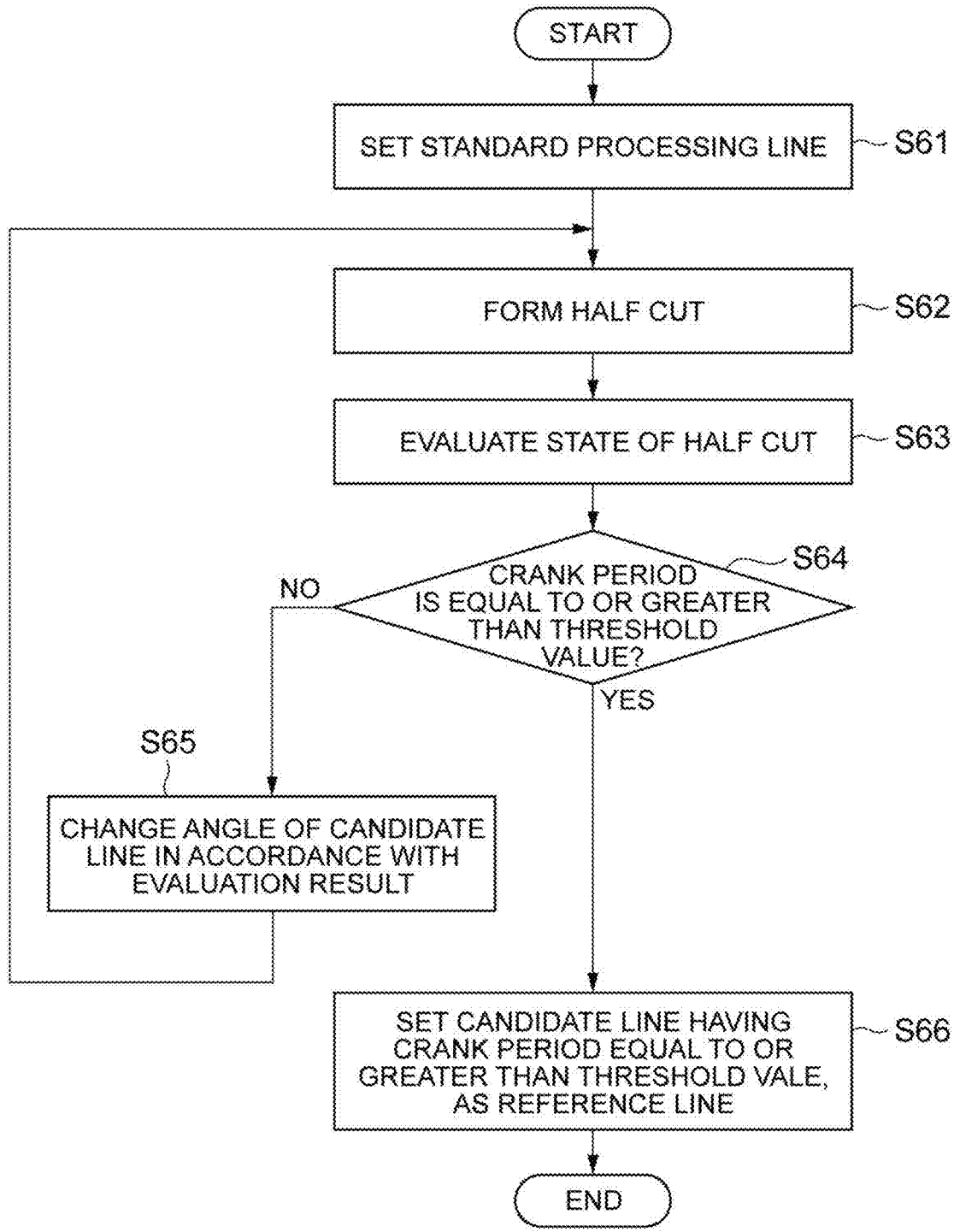
FIG. 18 is a flowchart illustrating processing of setting the reference line in a laser processing method according to a second embodiment.

As illustrated in FIG. 18, in the laser processing method according to the second embodiment, the reference line 5B is set in S10 as follows. That is, first, the substrate 12 is mounted on the support table 107 of the stage 111. The candidate line 5A parallel to the orientation flat OF (or inclined by the reference angle in the θ direction) is set as the standard processing line (S61).

Subsequently, along the candidate line 5A in the ineffective region 16x, the laser light L is scanned one or multiple times while being converged inside the substrate 12, and one or more rows of the modified region 7 are formed inside the substrate 12 of the ineffective region 16x. Accordingly, the half cut Hc reaching the front surface 12a of the substrate 12 in the ineffective region 16x is formed along the candidate line 5A (S62). Then, the surface image including the half cut Hc is imaged by the surface observation unit 211 and stored in the storage unit (ROM or RAM) of the controller 250.

Subsequently, the controller 250 performs image recognition processing to the surface image stored, and recognizes and evaluates the state of the half cut Hc (S63). It is determined whether or not the crank period of the half cut Hc is equal to or greater than the threshold value (S64). In a case of NO in S64 (in a case where the crank period is less than the threshold value), the angle in the θ direction of the candidate line 5A is changed in accordance with the recognition result, and a new candidate line 5A is set (S65).

In S65, in the plan view, a direction in the θ direction (whether it is the positive direction or the negative direction) in which the candidate line 5A rotates in the direction of deflection of the half cut Hc, is obtained as a specified rotation direction. A specified rotation angle is obtained from the crank period of the half cut Hc, using a data function or data table set in advance. The angle of the candidate line 5A in the θ direction is changed to deviate by a specified angle in the specified rotation direction. After S65, the processing returns to S62.

The threshold value can be set on the basis of the crank period of when the angular deviation Δθ is sufficiently small between the direction of the crystal orientation K and the direction of the candidate line 5A. The data function or data table is data relating to a correlation 66 (see FIG. 19(b)) between the angle formed by the candidate line 5A with respect to with respect to the crystal orientation K and the crank period (the degree of deflection of the half cut Hc). The threshold value and the data function or data table are stored in the storage unit (ROM) of the controller 250. Incidentally, rotating the processing line 5 to a deflection side of the crank shape in the θ direction is the same as rotating the object to be processed 1 to a side opposite to the deflection side of the crank shape in the θ direction.

In a case of YES in S64 (in a case where the crank period is equal to or greater than the threshold value), the current candidate line 5A is set as the reference line 5B, and the direction of the reference line 5B set is stored as the crystal orientation K in the storage unit of the controller 250 (S66).

Figure 19:
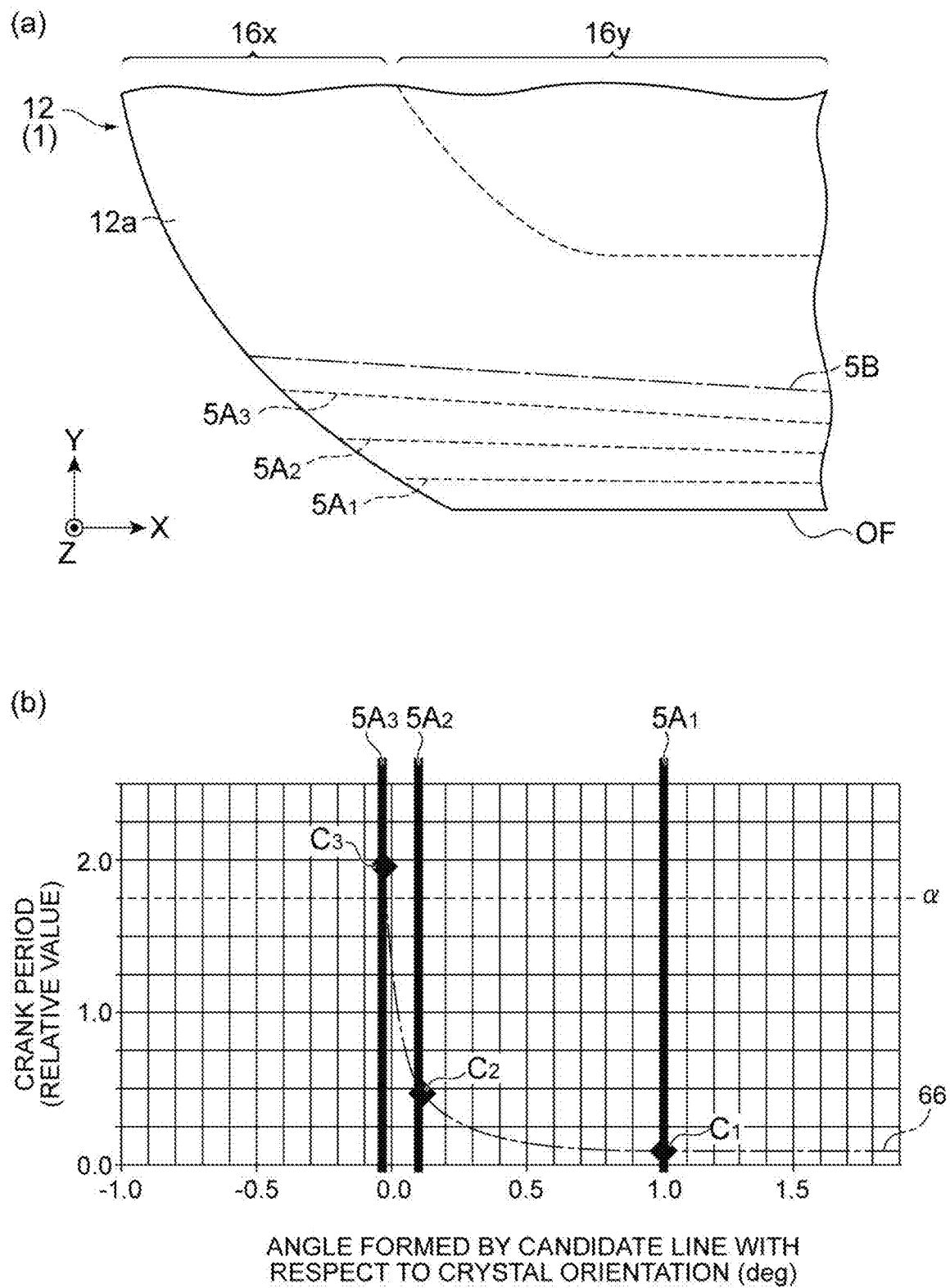
FIG. 19(a) is a plan view illustrating an example of the candidate line and the reference line set by the processing of FIG. 18.
FIG. 19(b) is a graph for explaining setting of the reference line in the processing of FIG. 18.

In the example illustrated in FIGS. 19(a) and 19(b), first, laser processing is performed along a candidate line $5A_1$ to form a half cut Hc. Since a crank period $C_1$ of the half cut Hc is less than a threshold value α, a candidate line $5A_2$ is newly set. Subsequently, laser processing is performed along the candidate line $5A_2$, and a half cut Hc is formed. Since a crank period $C_2$ of the half cut Hc is still less than the threshold value α, a candidate line $5A_3$ is newly set. Subsequently, laser processing is performed along the candidate line $5A_3$, and a half cut Hc is formed. A crank period $C_3$ of the half cut Hc is equal to or greater than the threshold value α. Therefore, the candidate line $5A_3$ is set as the reference line 5B. After that, in S20, the plurality of marks M is formed along the reference line 5B.

As described above, also in the present embodiment, the above-described effect is exerted that it is possible to inhibit the line to cut 5C from deviating with respect to the crystal orientation K of the substrate 12 and being set.

In the present embodiment, the controller 250 sequentially sets the plurality of candidate lines 5A for the object to be processed 1 until the degree of deflection of the half cut Hc falls within the predetermined range (here, the crank period becomes the threshold value α). Then, the candidate line 5A of which the degree of deflection of the half cut Hc falls within the predetermined range, is set as the reference line 5B. Accordingly, it is possible to set the reference line 5B for the object to be processed 1 with desired accuracy. For example, by setting the threshold value α to a value of when the crystal orientation K and the direction of the candidate line 5A match each other, high matching accuracy can be realized between the crystal orientation K and the reference line 5B.

In the present embodiment, the controller 250 sets the initial candidate line $5A_1$ for the object to be processed 1, using the orientation flat OF provided on the object to be processed 1 as a reference. That is, the standard processing line parallel to the orientation flat OF is set, and the candidate line $5A_1$ is set, using the standard processing line as a reference. In this case, fluctuation in settings of the candidate lines 5A for each object to be processed 1 can be inhibited.

The controller 250 of the present embodiment includes the storage unit that stores the correlation 66 (data function or data table) between the angle formed by the candidate line 5A with respect to the crystal orientation K and the degree of deflection of the half cut Hc. Accordingly, when setting a new candidate line 5A in S65, the correlation 66 can be used as an index. As a result, it is possible to reduce the number of candidate lines 5A that are sequentially set before the reference line 5B is set.

Next, a third embodiment will be described. In the description of the third embodiment, points different from the first embodiment will be described.

In the present embodiment, the controller 250 sets, for the object to be processed 1, the plurality of candidate lines 5A having mutually different line rotation angles that are θ direction angles formed with respect to a reference direction set in advance (hereinafter simply referred to as "line rotation angles"). Here, the reference direction is a direction along the standard processing line and is a direction parallel to the orientation flat OF (or inclined by the reference angle in the θ direction).

The controller 250 detects the inclination direction in which the half cut (crack) Hc of each of the plurality of candidate lines 5A is inclined with respect to corresponding one of the candidate lines 5A. In a case where the half cut Hc of each of the plurality of candidate lines 5A extends to be inclined with respect to each of the plurality of candidate lines 5A, the controller 250 detects whether the inclination direction is in one side or in the other side (opposite side of the one side) with respect to the plurality of candidate lines 5A. The inclination direction is a direction of the angular deviation Δθ with respect to the candidate line 5A. As the inclination direction, when viewed as the half cut Hc extends along the left and right direction, a case where the half cut Hc extends to be inclined upward may be referred to as an "upper side", and a case where the half cut Hc extends to be inclined downward may be referred to as "lower side". The inclination direction of the half cut Hc does not depend on whether the half cut Hc has a crank shape or not. That is, the half cut Hc may be inclined without having a crank shape.

The controller 250 detects a first candidate line of which the inclination direction of the half cut Hc is in one side of the candidate line 5A and the line rotation angle is the largest (or smallest) out of the plurality of candidate lines 5A. The controller 250 detects a second candidate line of which the inclination direction of the half cut Hc is in the other side of the candidate line 5A and the line rotation angle is the smallest (or largest) out of the plurality of candidate lines 5A. That is, in a case where search is performed for the plurality of candidate lines 5A in order of increasing or decreasing line rotation angle, the controller 250 detects the candidate line 5A immediately before the inclination direction of the half cut Hc is inverted, as the first candidate line, and detects the candidate line 5A immediately after the inclination direction of the half cut Hc is inverted, as the second candidate line.

Then, the controller 250 sets the reference line 5B for the object to be processed 1 on the basis of the first candidate line and the second candidate line. Specifically, when an angle formed with respect to the reference direction of the first candidate line is a first line rotation angle, and an angle formed with respect to the reference direction of the second candidate line is a second line rotation angle, the controller 250 sets, as the reference line 5B, the candidate line 5A having the line rotation angle of an angle between the first line rotation angle and the second line rotation angle. In other words, the candidate line 5A having the line rotation angle larger (or smaller) than the first candidate line and the line rotation angle smaller (or larger) than the second candidate line, is set as the reference line 5B.

Alternatively, in a case where there is no candidate line 5A having the line rotation angle of the angle between the first and second line rotation angles, the controller 250 may newly obtain a line inclined with respect to the reference direction by the angle between the first and second line rotation angles, to set the line as the reference line 5B. In a case where there is the plurality of candidate lines 5A corresponding to the angle between the first and second line rotation angles, the controller 250 may appropriately set any of the plurality of candidate lines 5A as the reference line 5B. The controller 250 may set, as the reference line 5B, the candidate line 5A having the half cut Hc not inclined, out of the plurality of candidate lines 5A.

As illustrated in FIG. 20, in the laser processing method according to the third embodiment, the reference line 5B is set in S10 as follows. That is, first, the substrate 12 is mounted on the support table 107 of the stage 111. The plurality of candidate lines 5A having mutually different line rotation angles is set for the object to be processed 1 (S31).

Subsequently, along the plurality of candidate lines 5A, the laser light L is scanned one or multiple times while being converged inside the substrate 12, and one or more rows of the modified region 7 are formed inside the substrate 12. Accordingly, the half cut Hc reaching the front surface 12a of the substrate 12 is formed along each of the plurality of candidate lines 5A (S32). Then, the surface image including the half cut Hc is imaged by the surface observation unit 211 and stored in the storage unit (ROM or RAM) of the controller 250.

Subsequently, the controller 250 performs image recognition processing to the surface image stored, and detects whether or not the half cut Hc of each of the plurality of candidate lines 5A is inclined with respect to corresponding one of the candidate lines 5A, and the inclination direction in a case where the half cut Hc is inclined (S33). The controller 250 identifies the first candidate line and the second candidate line from the plurality of candidate lines 5A, and selects the candidate line 5A on the basis of these first and second candidate lines. Specifically, the candidate line 5A is selected corresponding to the line rotation angle between the first and second line rotation angles (S34). The candidate line 5A selected is set as the reference line 5B, and the direction of the reference line 5B set is stored as the crystal orientation K in the storage unit of the controller 250 (S35).

FIG. 21(a) is a diagram illustrating an example of a processing result of the laser processing method according to the third embodiment. In the laser processing method of FIG. 21(a), the distance (closest approach distance) between the plurality of candidate lines 5A is set to 100 µm. The output of the laser light L is 3.5 µJ.

In the result illustrated in FIG. 21(a), the inclination direction of the half cut Hc is in the upper side at a line rotation angle from 0 deg to 0.024 deg, is not inclined at 0.025 deg, is inverted to be in the lower side at 0.026 deg, and is in the lower side from 0.026 deg to 0.04 deg. The half cut Hc having a line rotation angle from 0.02 deg to 0.026 deg does not include the crank shape. The candidate line 5A having a line rotation angle of 0.025 deg is set as the reference line 5B. That is, the direction of the candidate line 5A having the line rotation angle of 0.025 deg corresponds to the optimum angle (crystal orientation K). In this case, the candidate line 5A having a line rotation angle of 0.024 deg is the first candidate line (or the second candidate line) and the candidate line 5A having a line rotation angle of 0.026 deg is the second candidate line (or the first candidate Line).

FIG. 21(b) is a diagram illustrating another example of the processing result of the laser processing method according to the third embodiment. In the laser processing method of FIG. 21(b), the distance (closest approach distance) between the plurality of candidate lines 5A is set to 50 µm. The output of the laser light L is 4.5 µJ higher than the output of the laser processing method of FIG. 21(a).

Also in the result illustrated in FIG. 21(b), the inclination direction of the half cut Hc is in the upper side at a line rotation angle from 0 deg to 0.024 deg, is not inclined at 0.025 deg, is inverted to be in the lower side at 0.026 deg, and is in the lower side from 0.026 deg to 0.04 deg. The half cut Hc having a line rotation angle from 0.023 deg to 0.026 deg does not include the crank shape. The candidate line 5A having a line rotation angle of 0.025 deg is set as the reference line 5B. That is, the direction of the candidate line 5A having the line rotation angle of 0.025 deg corresponds to the optimum angle (crystal orientation K). Also in this case, the candidate line 5A having the line rotation angle of 0.024 deg is the first candidate line (or the second candidate line) and the candidate line 5A having the line rotation angle of 0.026 deg is the second candidate line (or the first candidate line).

As described above, also in the present embodiment, it is possible to inhibit the line to cut 5C from deviating with respect to the crystal orientation K of the substrate 12 of the object to be processed 1 and being set. In addition, it is found that the angle between the line rotation angle of the first candidate line and the line rotation angle of the second candidate line corresponds to the crystal orientation K of the substrate 12. Therefore, by setting the reference line 5B that is a line indicating the crystal orientation K of the substrate 12 on the basis of the first and second candidate lines, the reference line 5B can be set with high accuracy (with 0.001 deg accuracy).

The present embodiment can also be applied to a case where the half cut Hc does not have the crank shape (that is, the shape of deflection that is periodically repeated). In the present embodiment, even in a case where the distance between the plurality of candidate lines 5A set is as narrow as 50 µm (for example, in a case where it is narrower than the distance between the adjacent functional devices 15a), the reference line 5B can be set with high accuracy.

After S32, the controller 250 confirms (determines) that at least one of the plurality of half cuts Hc of the plurality of candidate lines 5A does not have the crank shape, and in a case of not having the crank shape, may perform S33 to S35. On the other hand, in a case where all of the plurality of half cuts Hc have the crank shape, the same processing as in the first embodiment or the second embodiment may be performed without performing S33 to S35. Incidentally, the present embodiment may be performed in a case where at least one of the plurality of half cuts Hc does not have the crank shape in the first embodiment or the second embodiment.

In the above, the embodiments of the present invention have been described; however, the present invention is not limited to the above-described embodiments, and may be modified within the range not changing the gist described in each claim or applied to other things.

In the above embodiments, the object to be processed 1 is cut along the line to cut 5C by forming the modified region 7 inside the object to be processed 1 along the line to cut 5C; however, a step and a configuration for cutting the object to be processed 1 are not particularly limited. For example, it may have a step and a configuration for cutting the object to be processed 1 by performing blade dicing with a dicing blade along the line to cut 5C. For example, it may have a step and a configuration for cutting the object to be processed 1 by performing ablation processing along the line to cut 5C. Known steps and configurations (devices) can be adopted as long as the object to be processed 1 can be cut along the line to cut 5C.

In the above embodiments, only one row may be formed of the modified regions 7 inside the object to be processed 1, or two or more rows may be formed of the modified regions 7 in which the positions thereof in the thickness direction are different from each other. In the above embodiments, the "laser light entrance surface" is the front surface 3 (the front surface 12a) and an "opposite surface of the laser light entrance surface" is the back surface 21; however, in a case where the back surface 21 is the "laser light entrance surface", the front surface 3 is the "opposite surface of the laser light entrance surface". The "match" includes not only an exact match but also a substantial match. The "match" includes a design error, a manufacturing error, and a measurement error.

One aspect of the present invention can also be regarded as the chip manufactured by the laser processing device or the laser processing method. One aspect of the present invention may be applied only in a case where the processing line 5 is set along the direction parallel to the orientation flat OF, or may be applied only in a case where the processing line 5 is set along the direction vertical to the orientation flat OF. Further, one aspect of the present invention may be applied to a case where the processing line 5 is set along the directions parallel and vertical to the orientation flat OF. In the above, the controller 250 constitutes a candidate line setting unit, an operation controller, a reference line setting unit, a line to cut setting unit, and a storage unit.

INDUSTRIAL APPLICABILITY

With one aspect of the present invention, it is possible to provide a laser processing device and a laser processing method capable of inhibiting the line to cut from deviating with respect to the crystal orientation of the substrate of the object to be processed and being set.

REFERENCE SIGNS LIST

1 . . . object to be processed, 3, 12a . . . front surface, 5A . . . candidate line, 5B . . . reference line, 5C . . . line to cut, 7 . . . modified region, 12 . . . substrate, 100, 300 . . . laser processing device, 107 . . . support table, 202 . . . laser light source, 204 . . . converging optical system, 211 . . . surface observation unit (imaging unit), 240 . . . display unit, 250 . . . controller (candidate line setting unit, operation controller, reference line setting unit, line to cut setting unit, storage unit), Hc . . . half cut (crack), K . . . crystal orientation, L . . . laser light, M . . . mark (reference mark), OF . . . orientation flat.

The invention claimed is:

1. A laser processing device comprising:
a support table configured to support an object to be processed including a substrate made of a crystalline material;
a laser light source configured to emit laser light;
a converging optical system configured to converge the light emitted from the laser light source at the object to be processed supported by the support table;
an imaging unit configured to image a front surface of the object to be processed supported by the support table;
a candidate line setting unit configured to set, for the object to be processed, a plurality of candidate lines extending in mutually different directions;
an operation controller configured to control operation of at least one of the support table, the laser light source, and the converging optical system such that a modified region is formed inside the substrate along each of the plurality of candidate lines, and a crack reaches the front surface of the object to be processed from the modified region; and
a reference line setting unit configured to set, for the object to be processed, a reference line determined as a line indicating a crystal orientation of the substrate on the basis of an image of the crack imaged by the imaging unit.

2. The laser processing device according to claim 1, wherein
the candidate line setting unit sets, for the object to be processed, a predetermined number of the candidate lines extending in mutually different predetermined directions, and
the reference line setting unit sets, for the object to be processed, as the reference line, a candidate line having a smallest degree of deflection of the crack out of the predetermined number of candidate lines.

3. The laser processing device according to claim 2, wherein
the candidate line setting unit sets, for the object to be processed, the predetermined number of the candidate lines extending in mutually different predetermined directions, using an orientation flat provided to the object to be processed as a reference.

4. The laser processing device according to claim 1, wherein
the candidate line setting unit sets the plurality of candidate lines sequentially for the object to be processed, until a degree of deflection of the crack falls within a predetermined range, on the basis of the image of the crack imaged by the imaging unit, and
the reference line setting unit sets, for the object to be processed, as the reference line, one of the candidate lines of which the degree of deflection of the crack falls within the predetermined range.

5. The laser processing device according to claim 4, wherein
the candidate line setting unit sets an initial candidate line for the object to be processed, using an orientation flat provided to the object to be processed as a reference.

6. The laser processing device according to claim 4, further comprising
a storage unit storing in advance a relationship between an angle formed by the candidate line with respect to the crystal orientation and a degree of deflection of the crack.

7. The laser processing device according to claim 1, wherein
the candidate line setting unit sets, for the object to be processed, the plurality of candidate lines having different angles formed with respect to a reference direction,
the reference line setting unit detects an inclination direction in which the crack of each of the plurality of candidate lines is inclined with respect to corresponding one of the candidate lines, and
the reference line setting unit sets the reference line for the object to be processed, on the basis of a first candidate line of which an inclination direction of the crack is in one side of corresponding one of the candidate lines and an angle formed with respect to the reference direction is the largest or smallest, and a second candidate line of which an inclination direction of the crack is in another side of corresponding one of the candidate lines and an angle formed with respect to the reference direction is the smallest or largest, out of the plurality of candidate lines.

8. The laser processing device according to claim 1, further comprising
a display unit configured to display the image of the crack imaged by the imaging unit.

9. The laser processing device according to claim 1, wherein
the operation controller controls operation of at least one of the support table, the laser light source, and the converging optical system such that a reference mark indicating the crystal orientation is formed on the object to be processed along the reference line set by the reference line setting unit.

10. The laser processing device according to claim 1, further comprising
a line to cut setting unit configured to set, for the object to be processed, a line to cut extending in a direction parallel to the reference line set by the reference line setting unit, wherein
the operation controller controls operation of at least one of the support table, the laser light source, and the converging optical system such that the modified region is formed inside the substrate along the line to cut set by the line to cut setting unit.

11. A laser processing method comprising:
a first step of setting a plurality of candidate lines extending in mutually different directions, for an object to be processed including a substrate made of a crystalline material;
a second step of converging laser light at the object to be processed such that a modified region is formed inside the substrate along each of the plurality of candidate lines, and a crack reaches a front surface of the object to be processed from the modified region; and a third step of setting, for the object to be processed, a reference line determined as a line indicating a crystal orientation of the substrate on the basis of a state of the crack.

12. The laser processing method according to claim 11, wherein, in the first step, a predetermined number of the candidate lines extending in mutually different predetermined directions are set for the object to be processed, and in the third step, out of the predetermined number of candidate lines, a candidate line having a smallest degree of deflection of the crack is set for the object to be processed as the reference line.

13. The laser processing method according to claim 11, wherein, in the first step, on the basis of a state of the crack, the plurality of candidate lines is sequentially set for the object to be processed, until a degree of deflection of the crack falls within a predetermined range, and in the third step, one of the candidate lines of which the degree of deflection of the crack falls within the predetermined range is set for the object to be processed as the reference line.

14. The laser processing method according to claim 11, wherein, in the first step, the plurality of candidate lines having different angles formed with respect to a reference direction is set for the object to be processed, and in the third step, an inclination direction in which the crack of each of the plurality of candidate lines is inclined with respect to corresponding one of the candidate lines, is detected, and the reference line is set for the object to be processed, on the basis of a first candidate line of which an inclination direction of the crack is in one side of corresponding one of the candidate lines and an angle formed with respect to the reference direction is the largest or smallest, and a second candidate line of which an inclination direction of the crack is in another side of corresponding one of the candidate lines and an angle formed with respect to the reference direction is the smallest or largest, out of the plurality of candidate lines.

15. The laser processing device according to claim 5, further comprising a storage unit storing in advance a relationship between an angle formed by the candidate line with respect to the crystal orientation and a degree of deflection of the crack.

16. The laser processing method according to claim 12, wherein, in the first step, the plurality of candidate lines having different angles formed with respect to a reference direction is set for the object to be processed, and in the third step, an inclination direction in which the crack of each of the plurality of candidate lines is inclined with respect to corresponding one of the candidate lines, is detected, and the reference line is set for the object to be processed, on the basis of a first candidate line of which an inclination direction of the crack is in one side of corresponding one of the candidate lines and an angle formed with respect to the reference direction is the largest or smallest, and a second candidate line of which an inclination direction of the crack is in another side of corresponding one of the candidate lines and an angle formed with respect to the reference direction is the smallest or largest, out of the plurality of candidate lines.

17. The laser processing method according to claim 13, wherein, in the first step, the plurality of candidate lines having different angles formed with respect to a reference direction is set for the object to be processed, and in the third step, an inclination direction in which the crack of each of the plurality of candidate lines is inclined with respect to corresponding one of the candidate lines, is detected, and the reference line is set for the object to be processed, on the basis of a first candidate line of which an inclination direction of the crack is in one side of corresponding one of the candidate lines and an angle formed with respect to the reference direction is the largest or smallest, and a second candidate line of which an inclination direction of the crack is in another side of corresponding one of the candidate lines and an angle formed with respect to the reference direction is the smallest or largest, out of the plurality of candidate lines.

* * * * *